(12) United States Patent
Eguchi

(10) Patent No.: US 6,338,398 B1
(45) Date of Patent: Jan. 15, 2002

(54) VEHICLE WITH BRAKING FORCE RETAINING UNIT

(75) Inventor: Takahiro Eguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/592,444

(22) Filed: Jun. 12, 2000

(30) Foreign Application Priority Data

Jun. 11, 1999 (JP) .......................................... 11-164645

(51) Int. Cl.[7] .................................................. B60T 7/12
(52) U.S. Cl. ........................................ 188/134; 137/598
(58) Field of Search ........................ 188/134; 192/13 A, 192/13 R, 4 A; 137/598

(56) References Cited

U.S. PATENT DOCUMENTS 4,681,196 A * 7/1987 Fulmer ...................... 192/3 H
5,819,897 A * 10/1998 Murata ...................... 192/13 A

FOREIGN PATENT DOCUMENTS

| JP | 62-114832 | 7/1987 | ........... B60K/28/10 |
| JP | 63-170529 | 7/1988 | ........... F02D/29/00 |
| JP | 401244930 A | * 9/1989 | |
| JP | 7-144625 | 6/1995 | ............. B60T/7/12 |

OTHER PUBLICATIONS

Patent Abstract of Japan, 09202159, Aug. 5, 1997.

*Primary Examiner*—Christopher P. Schwartz
*Assistant Examiner*—C. Bartz
(74) *Attorney, Agent, or Firm*—Sughrue Mion, PLLC

(57) ABSTRACT

A vehicle with a braking force retaining unit, which retains braking force after releasing the brake pedal, wherein driving force of the vehicle is increased if displacement of the vehicle is detected while the braking force retaining unit is in operation.

4 Claims, 11 Drawing Sheets

《Time Chart for Control without Automatic Engine Stop Operation》

VEHICLE WITH BRAKING FORCE RETAINING UNIT

FIELD OF THE INVENTION

The present invention relates to a vehicle having a braking force retaining unit, which is capable of retaining a braking force after releasing the brake pedal such that the braking force continuously acts on the vehicle.

BACKGROUND OF THE INVENTION

Braking force retaining units are known for continuously retaining braking force on a vehicle after releasing the brake pedal such that the braking force continuously acts on the vehicle. Such a braking force retaining unit facilitates a smooth starting operation of the vehicle on a slope without unintentional backward displacement of the vehicle.

For example, Japanese Patent Publication No.9-202159 discloses a braking force control unit utilizing a traction control system. Such a braking force control unit retains a certain level of braking force by the control of the traction control system until driving force detecting means detects strong driving force (when starting driving force occurs) switched from weak driving force. When driving force is switched to the strong driving force, the retained braking force is released, thereby preventing unintentional backward displacement of the vehicle on an up slope.

The applicant also discloses a brake fluid pressure retaining unit utilizing a brake fluid pressure reduction speed control means in Japanese Patent Application No.10-370249. The brake fluid pressure retaining unit retains braking force until starting driving force is exerted on the vehicle in such a way that reduction speed of brake fluid pressure within a wheel cylinder is less than that of brake pedal load applied by a driver and the brake fluid pressure is gradually reduced. When starting driving force is exerted to start the vehicle, the brake fluid pressure retaining unit releases brake fluid pressure within the wheel cylinder so as to release braking force. Therefore, the driver can start the vehicle on an up slope without unintentional backward displacement. On a down slope, the driver can start the vehicle by releasing or partly loosening the brake pedal.

However, on a steep slope, even if the vehicle is equipped with the above braking force retaining unit, the vehicle often displaces backwards with the displacement force derived from the vehicle's own weight being greater than the retained braking force. This can happen while the braking force retaining unit is in operation. Especially in the aforementioned braking force control unit, retained braking force may be decreased to a lower value than the initial braking force value that is the braking force retained before starting the release of the brake pedal. In the aforementioned brake fluid pressure retaining unit, retained braking force is not held in a certain value, but is gradually decreased by the brake fluid pressure reduction speed control means. The vehicle tends to displace backwards on a slope if retained braking force is decreased, for the purpose of ensuring a smooth release of the braking force, in advance of occurrence of starting driving force.

With the foregoing drawbacks of the prior art in view, the present invention seeks to provide a vehicle with a braking force retaining unit, which quickly restricts backward displacement of the vehicle when the vehicle starts to displace backward on a slope.

SUMMARY OF THE INVENTION

According to the present invention, there is provided a vehicle with a braking force retaining unit, which retains braking force after releasing the brake pedal, wherein the vehicle further comprises means for increasing driving force if displacement of the vehicle is detected while the braking force retaining unit is in operation.

Another object of the invention is to provided a vehicle with a braking force retaining unit, which retains braking force after releasing the brake pedal, wherein driving force of the vehicle is increased if displacement of the vehicle is detected while the braking force retaining unit is in operation.

In such a vehicle with the braking force retaining unit, backward displacement of the vehicle is restricted, even if displacement of the vehicle occurs with the displacement force derived from the vehicle's own weight being greater than the retained braking force, since driving force is immediately increased when detecting backward displacement (displacement) of the vehicle. Increasing driving force of the vehicle includes the following two cases, these are: (1) driving force occurs from zero and increases, and (2) already existing driving force is further increased.

BRIEF DESCRIPTION OF THE DRAWINGS

FIG. 3 shows the control logic of the braking force retaining unit of FIG. 2, in which

FIG. 4 shows control of a driving force control unit according to a preferred embodiment of the invention, in which

FIG. 6 shows control of the braking force retaining unit, in which

FIG. 7 shows control of the driving force control unit, in which FIG. 7A shows a backward displacement detecting version of the vehicle, and FIG. 7B shows a vehicle movement detecting version.

FIG. 8 shows control of the driving motor stopping unit, in which FIG. 8A shows a backward displacement detecting version of the vehicle, and FIG. 8B shows a vehicle movement detecting version.

FIG. 9 shows a way of detecting backward displacement of the vehicle, in which

DESCRIPTION OF THE PREFERRED EMBODIMENTS

A vehicle with a braking force retaining unit according to the present invention (hereinafter referred to as a vehicle) includes a braking force retaining unit, which continuously retains braking force after releasing the brake pedal. The vehicle is further equipped with a driving force control unit or/and a driving motor stopping unit. The driving force control unit decreases creep driving force when the motor is in idling condition and the brake pedal is depressed under or equal to a certain vehicle speed. The driving motor stopping unit can automatically turn off the motor while the vehicle stops. Further, the driving force control unit increases the decreased driving force, which has been reduced by the driving force control unit or completely lost with the automatic motor stop operation of the driving force control unit. The vehicle shown in this preferred embodiment is a hybrid type vehicle having an engine as an internal combustion engine operable by gasoline and the like, and an electric motor as a driving motor, and is provided with a belt-type continuously variable transmission (hereinafter referred to as CVT) as a transmission. In this vehicle, the driving motor is not restricted merely to an engine and a motor. Similarly, the transmission is not restricted to a particular type. The transmission may be an automatic transmission having a torque converter or a manual transmission.

In creep running, the vehicle with an automatic transmission moves slowly as if it creeps on the ground when the transmission is selected to a running range such as D range or R range and the accelerator pedal is released (the driving motor is in idling condition).

<System Configuration>

Figure 1:
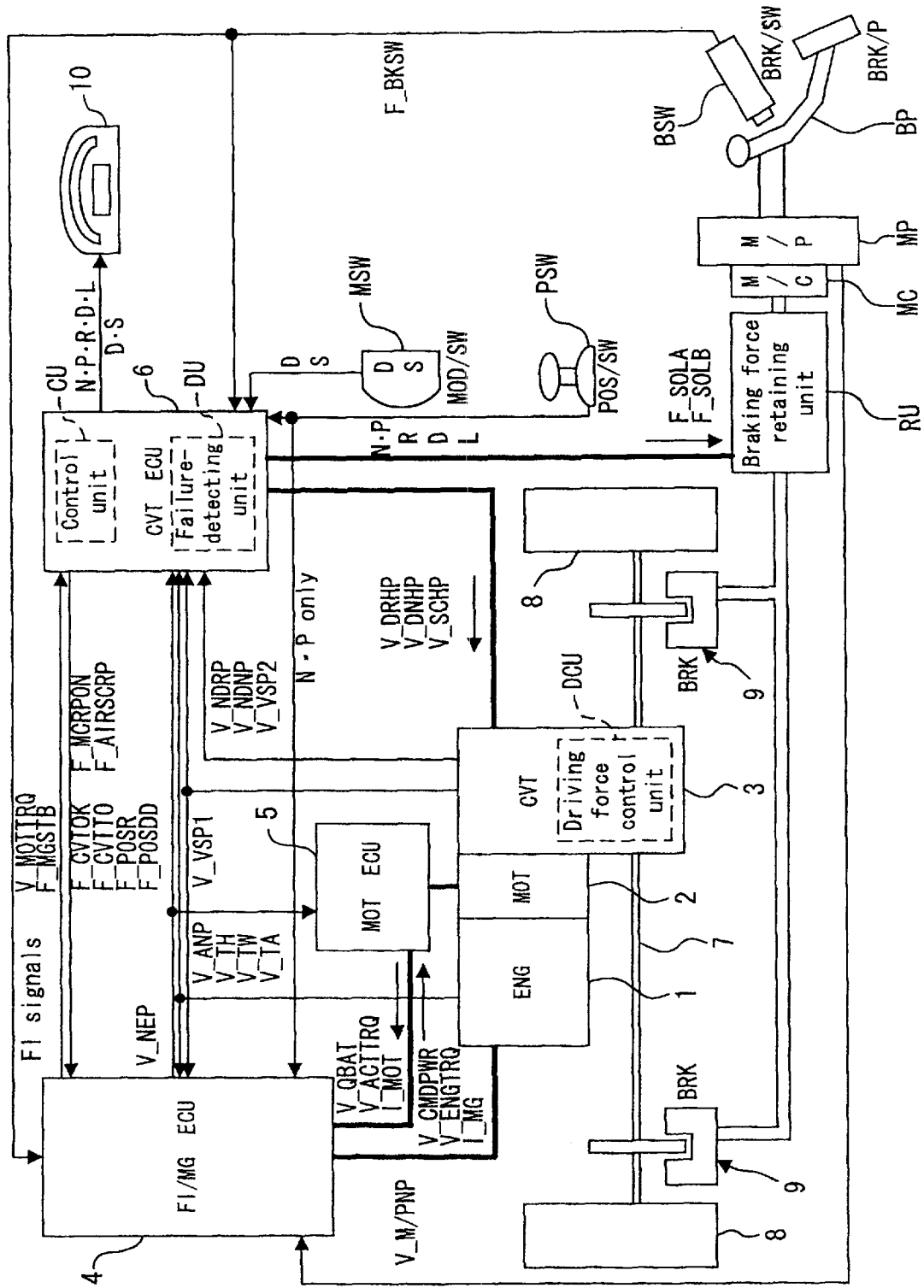
FIG. 1 shows a system configuration of a vehicle with a braking force retaining unit according to the invention.

The system configuration of a vehicle according to the present invention will be described with reference to FIG. 1. The vehicle shown in this embodiment includes an engine 1 and a motor 2 as a driving motor, and is equipped with CVT 3 as a transmission.

The engine 1 is controlled at a fuel injection electronic control unit (hereinafter referred to as FI ECU). The FI ECU is integrally constructed with a management electronic control unit (hereinafter referred to as MG ECU), and it is incorporated in a fuel injection/management electronic control unit 4 (hereinafter referred to as FI/MG ECU). The motor 2 is controlled at a motor electronic control unit 5 (hereinafter referred to as MOT ECU). Further, the CVT 3 is controlled at a CVT electronic control unit 6 (hereinafter referred to as CVT ECU).

Figure 2:
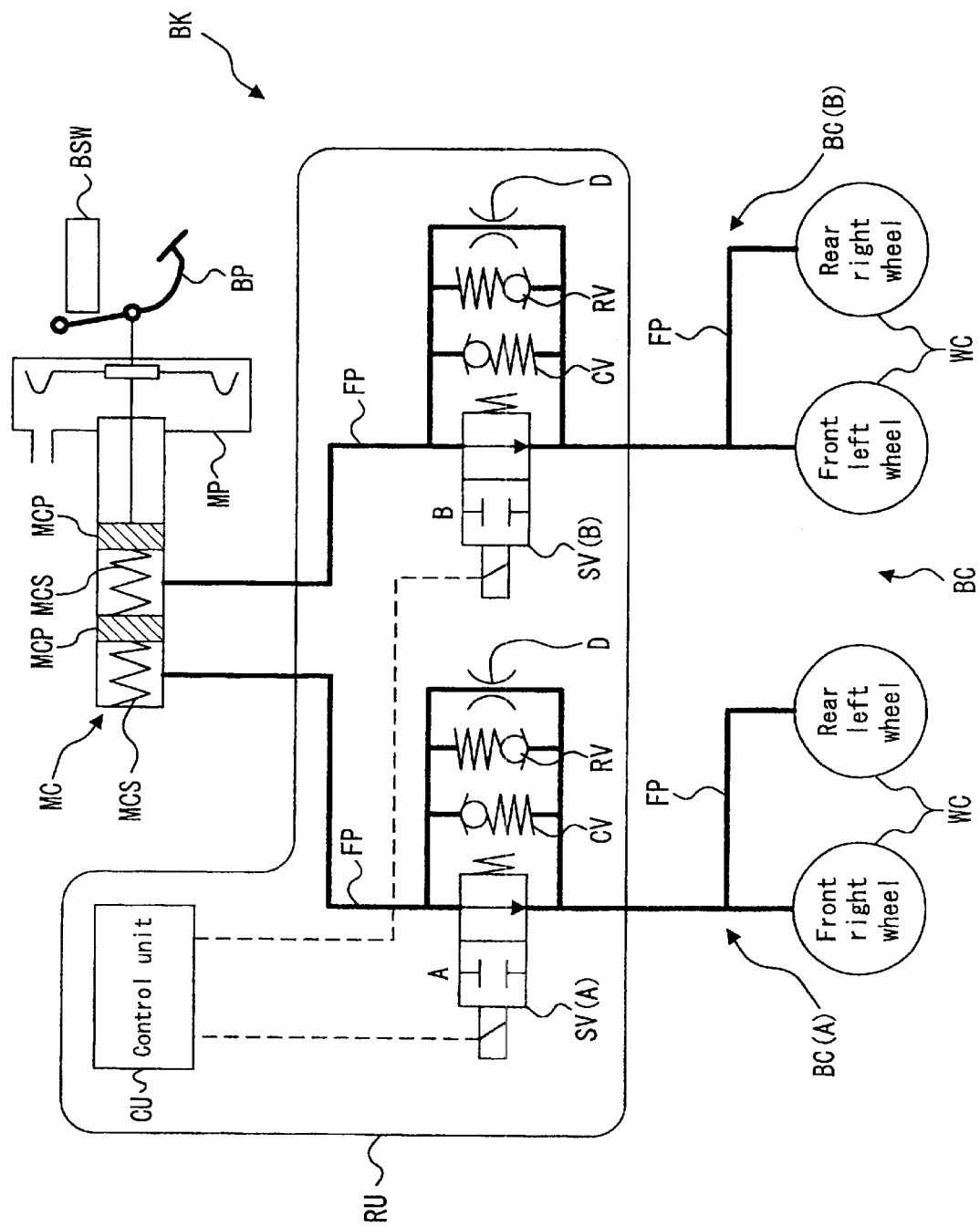
FIG. 2 shows construction of the braking force retaining unit of FIG. 1.

A drive axle 7 provided with driving wheels 8, 8 is mounted to the CVT 3. Each driving wheel 8 is provided with a disc brake 9, which includes a wheel cylinder WC and the like (FIG. 2). The wheel cylinders WC of the disc brakes 9,9 are connected to a master cylinder MC through a braking force retaining unit RU. When the driver depresses the brake pedal BP, brake pedal load generated is transmitted to the master cylinder MC through the master power MP. The brake switch BSW detects whether the brake pedal BP is depressed or not.

The engine 1 is an internal combustion engine, which makes use of thermal energy. The engine 1 drives the driving wheels 8, 8 through the CVT 3 and the drive axle 7. In order to improve fuel consumption, the engine 1 may be automatically turned off while the vehicle stops. For this reason, the vehicle is provided with a driving motor stopping unit for automatically turning off the engine 1 when a certain automatic engine stop condition is satisfied.

The motor 2 has an assist mode for the assist of the engine drive with the use of electric energy from a non-shown battery. The motor 2 has a regeneration mode for converting the kinetic energy derived from the rotation of the drive axle 7 into electric energy. When the engine does not require the assist from the assist mode (such as for starting on a down slope or deceleration of the vehicle), the thus converted electric energy is stored in a non-shown battery. Further, the motor 2 has an actuation mode for actuating the engine 1.

The CVT 3 includes an endless belt winded between a drive pulley and a driven pulley so as to enable continuously variable gear ratio by changing a winding radius of the endless belt. Change of the winding radius is achieved by changing each pulley width. The CVT 3 engages a starting clutch and an output shaft so as to transmit the output of the engine 1 converted by the endless belt into the drive axle 7 through gears at the output side of the starting clutch. The vehicle equipped with the CVT 3 enables creep running, and such a vehicle requires a driving force control unit DCU for changing driving force to be utilized for the creep running.

Creep driving force is adjusted by the engaging force of the starting clutch (driving force transmission capacity). The creep driving force includes three conditions, i.e., a strong condition, weak condition, and a middle condition between the strong and weak conditions. In this embodiment, the strong condition is referred to as a strong creep condition, and the weak condition is referred to as a weak creep condition, and further the middle condition is referred to as a middle creep condition. Further, the strong creep condition includes two driving force levels, i.e., a strong level and a weak level. The strong level is merely referred to as a strong creep condition, and the weak level is referred to as a strong creep condition for driving. In the strong creep condition, driving force is adjusted so as to keep the vehicle stationary on a slope having an inclination angle of 5 degrees. In the strong creep condition, vehicle speed is under or equal to 5 km/h. In the strong creep condition for driving, driving force is adjusted to be less than that in the strong creep condition. The strong creep condition for driving is a preliminary condition before switching to the weak creep condition, in which vehicle speed is over 5 km/h. In the weak creep condition, almost no driving force is obtained. In the middle creep condition, driving force is controlled substantially to a half extent between the strong creep condition and the weak creep condition. The middle creep condition is an intermediate condition when driving force is stepwise decreased in the process of switching from the strong creep condition to the weak creep condition. The strong creep condition is achieved when the accelerator pedal is released (idling condition) and the positioning switch PSW selects a running range (D range, L range or R range) and further the brake pedal BP is released. In the strong creep condition, the vehicle moves slowly as if it creeps on the ground. Meanwhile, the vehicle stops or moves at an extremely low speed in the weak creep condition, with the brake pedal BP depressed under or equal to a certain vehicle speed.

Range positions of the positioning switch PSW are selected by a shift lever. Such range positions are selected from P range to be used for parking the vehicle, N range as a neutral range, R range for backward running, D range to be used for a normal run, and L range to be used for obtaining a sudden acceleration or strong engine brake. The term "running range" indicates a range position, at which the vehicle can move. In this vehicle, the running range includes D range, L range and R range. Further, when the positioning switch PSW selects D range, D mode as a normal running mode and S mode as a sports mode can be selected by a mode switch MSW. Information of the positioning switch PSW and the mode switch MSW is transmitted to the CVT ECU 6 and further to a meter 10. The meter 10 indicates the range information and the mode information selected by the positioning switch PSW and the mode switch, respectively.

FI ECU contained in the FI/MG ECU 4 controls the amount of fuel injection so as to achieve the optimum air fuel ratio, and it also generally controls the engine 1. Various kinds of information such as a throttle angle and conditions of the engine 1 is transmitted to the FI ECU such that the engine 1 is controlled based on such information. The MG ECU contained in the FI/MG ECU 4 mainly controls the MOT ECU 5 as well as judges automatic engine stop conditions and automatic engine actuation conditions. The MG ECU receives information as to conditions of the motor 2 and other information such as conditions of the engine 1 from the FI ECU, and based on such information it sends instructions about mode switching of the motor 2 to the MOT ECU 5. Further, the MG ECU receives information such as conditions of the CVT 3, conditions of the engine 1, range information of the positioning switch PSW, conditions of the motor 2 and the like, and based on such information it judges whether the engine 1 should be automatically stopped or automatically actuated.

The MOT ECU 5 controls the motor 2 based on a control signal from the FI/MG ECU 4. The control signal from the FI/MG ECU 4 includes mode information instructing actuation of the engine 1 by the motor 2, assistance of the engine actuation or regeneration of electric energy, and an output required value to the motor 2, and the MOT ECU 5 sends an order to the motor 2 based on such information. Further, the MOT ECU 5 receives information from the motor 2 and transmits information such as the amount of generated energy and the capacity of the battery to the FI/MG ECU 4.

The CVT ECU 6 controls the transmission gear ratio of the CVT 3, the engaging force of the starting clutch (the driving force transmission capacity) and the like. Various kinds of information such as conditions of the CVT 3, conditions of the engine 1, range information of the positioning switch PSW and the like is transmitted to the CVT ECU 6, and based on such information the CVT ECU 6 transmits a signal to the CVT 3, the signal of which includes control of hydraulic pressure of each cylinder provided at the drive pulley and the driven pulley of the CVT 3, and control of hydraulic pressure of the starting clutch. As shown in FIG. 2, the CVT ECU 6 comprises a control unit CU for the ON/OFF control (shut-off/communicate) of solenoid valves SV(A), SV(B) of the braking force retaining unit RU. The CVT ECU 6 transmits a signal for ON and OFF the solenoid valves SV(A), SV(B) to the braking force retaining unit RU. The CVT ECU 6 judges switching of creep driving force as well as judges increment of driving force upon detecting a movement (or a backward displacement) of the vehicle while the braking force retaining unit RU is in operation. The CVT ECU 6 transmits the judgement information to the driving force control unit DCU of the CVT 3. The CVT ECU 6 further comprises a failure-detecting unit DU for the purpose of detecting malfunction of the braking force retaining unit RU.

The disk brakes 9, 9 are constructed such that a disk rotor rotatable with the driving wheel 8 is pressed between the brake pads moved by the wheel cylinder WC (FIG. 2) and braking force is obtained by the frictional force therebetween. Brake fluid pressure within the master cylinder MC is transmitted to the wheel cylinders WC through the braking force retaining unit RU.

The braking force retaining unit RU continuously retains brake fluid pressure within a wheel cylinder WC, i.e. braking force, after depression of the brake pedal BP is released. The braking force retaining unit RU comprises a control unit CU within the CVT ECU 6. Construction of the braking force retaining unit RU will be described later in greater detail with reference to FIG. 2.

ON/OFF operation of the solenoid valve is meant as follows: In the normally open type solenoid valve, when the solenoid valve is ON, the solenoid valve closes and is in closed condition, and when the solenoid valve is OFF, the solenoid valve opens and is in open condition. Meanwhile, in the normally closed type solenoid valve, when the solenoid valve is ON, the solenoid valve opens and is in open condition, and when the solenoid valve is OFF the solenoid valve closes and is in closed condition. The solenoid valves SV(A), SV(B) in the preferred embodiment are of normally open type. A driving circuit within the control unit CU carries out or ceases a supply of electric currents to respective coils of the solenoid valves SV(A), SV(B) so as to ON and OFF the solenoid valves SV(A), SV(B).

A master cylinder MC is a device for converting a brake pedal depression into hydraulic pressure. In order to assist the brake pedal depression, a master power MP is provided between the master cylinder MC and the brake pedal BP. The master power MP enhances braking force by way of applying negative pressure of the engine 1 or compressed air to the driver's brake pedal depression force. A brake switch BSW is provided at the brake pedal BP so as to detect whether or not the brake pedal BP is depressed.

The driving force control unit DCU of the vehicle is incorporated in the CVT 3. The driving force control unit DCU variably controls the driving force transmission capacity of the starting clutch, thereby changing creep driving force. The driving force control unit DCU increases driving force when displacement of the vehicle (or backward displacement of the vehicle) is detected. The driving force control unit DCU comprises CVT ECU 6, which judges switching of creep driving force as well as judges the increment of driving force upon detecting a movement (or a backward displacement) of the vehicle, and which transmits, based on the judgement information, a hydraulic pressure command value to a linear solenoid valve controlling the engagement hydraulic pressure of the starting clutch.

The driving force control unit DCU controls the driving force transmission capacity of the starting clutch and switches to the driving force in each creep condition when the CVT ECU 6 judges conditions (hereinafter described) required for a weak creep condition, middle creep condition, strong creep condition or a strong creep condition for driving. Further, the driving force control unit DCU increases the driving force transmission capacity of the starting clutch and switches to the strong creep condition if a movement or backward displacement of the vehicle is detected. Detection for backward displacement or movement of the vehicle is included in the condition required for a strong creep order or the condition required for an automatic engine actuation order. The CVT ECU 6 judges the above conditions, and it transmits a hydraulic pressure command value to a linear solenoid valve of the CVT 3, where the engagement hydraulic pressure of the starting clutch is controlled. In the driving force control unit DCU, the driving force transmission capacity (engagement force)

of the starting clutch is adjusted at the CVT 3 based on the hydraulic pressure command value, and thereby switching the creep driving force. Since the driving force control unit DCU decreases driving force, deteriorated fuel consumption of the vehicle is prevented. The term "driving force transmission capacity" indicates the maximum driving force (driving torque) transmitted by the starting clutch. When a failure-detecting unit DU detects malfunction of the braking force retaining unit RU, the switching operation of the driving force control unit DCU to the weak creep condition is restricted.

The driving motor stopping unit incorporated in the vehicle is constructed by the FI/MG ECU 4 and others. The driving motor stopping unit enables an automatic engine stop operation while the vehicle stops. The automatic engine stop conditions are judged at the FI/MG ECU 4 and the CVT ECU 6. The automatic engine stop conditions will be described later. When all of the automatic engine stop conditions are satisfied, the FI/MG ECU 4 sends an engine stop order to the engine 1 so as to automatically turn off the engine 1. Since the driving motor stopping unit automatically turns off the engine 1, improved fuel consumption of the vehicle is achieved.

The FI/MG ECU 4 and the CVT ECU 6 judges automatic engine actuation conditions while the driving motor stopping unit automatically turns off the engine 1. When all of the automatic engine actuation conditions are satisfied, the FI/MG ECU 4 sends an engine actuation order to the MOT ECU 5. The MOT ECU 5 further transmits an engine actuation order to the motor 2. The motor 2 then automatically actuates the engine 1, and at the same time driving force is switched to the strong creep condition. The automatic engine actuation conditions will be described later.

Further, when the failure-detecting unit DU detects malfunction of the braking force retaining unit RU, operation of the driving motor stopping unit is prohibited.

Signals to be transmitted and received in this system will be described. With reference to FIG. 1, the letter "F__" in front of each signal indicates that the signal is flag information, which is either 0 or 1. The letter "V__" indicates that the signal is numerical information (unit is optional), and the letter "I__" indicates that the signal includes plural kinds of information.

A signal transmitted from the FI/MG ECU 4 to the CVT ECU 6 will be described. V__MOTTRQ represents an output torque value of the motor 2. F__MGSTB is a flag showing whether all of the engine stop conditions judged at the FI/MG ECU 4 are satisfied. If all the conditions are satisfied, the numeral 1 is given, and if not, the numeral 0 is given. The automatic engine stop conditions regarding the F__MGSTB will be described later. When the F__MGSTB and F__CVTOK (hereinafter described) are both turned to 1, the engine 1 is automatically turned off. When one of these flags is turned to 0, the engine 1 is automatically turned on.

A signal transmitted from the FI/MG ECU 4 to the CVT ECU 6 and the MOT ECU 5 will be described. V__NEP represents engine speed.

A signal transmitted from the CVT ECU 6 to the FI/MG ECU 4 will be described. F__CVTOK is a flag showing whether all of the engine stop conditions judged at the CVT ECU 6 are satisfied. If all the conditions are satisfied, the numeral 1 is given, and if not, the numeral 0 is given. The automatic engine stop conditions regarding the F__CVTOK will be described later. F__CVTTO is a flag showing whether the oil temperature of the CVT 3 is over a certain value. If the oil temperature is at the certain value or more, the numeral 1 is given, and if the oil temperature is below the value, the numeral 0 is given. The oil temperature of the CVT 3 is obtained from an electrical resistance value of the linear solenoid valve controlling hydraulic pressure of the starting clutch at the CVT 3. F__POSR is a flag showing a condition whether the positioning switch PSW is selected in R range. If the positioning switch PSW selects R range, the numeral 1 is given, and if not, the numeral 0 is given. F__POSDD is a flag showing a condition whether the positioning switch PSW selects D range and the mode switch MSW selects D mode. If D range and D mode (D range/D mode) are selected, the numeral 1 is given, and if not, the numeral 0 is given. When the FI/MG ECU 4 does not receive any information indicating D range/D mode, R range, P range or N range, the FI/MG ECU 4 judges that either D range/s mode or L range is selected.

F__MCRPON is a flag whether or not driving force is in the middle creep condition. The numeral 1 is given in the middle creep condition, and if not, the numeral 0 is given. When F__MCRPON is 1, the engine 1 is required to blow middle air in the middle creep condition (weaker air than that in the strong creep condition). F__AIRSCRP is a strong air demand flag in the strong creep condition. If strong air is required in the strong creep condition, the numeral 1 is given, and if not, the numeral 0 is given. When both F__MCRPON and F__AIRSCRP are 0, FI/MG ECU blows weak air in the weak creep condition. In order to keep the engine idle speed at a certain level regardless of the driving force in the strong creep condition, middle creep condition or the weak creep condition, output of the engine should be adjusted by way of blowing corresponding air to the strong creep condition, middle creep condition or the weak creep condition. When the driving force is in the strong creep condition and a load of the engine 1 is higher, a strong air blow (strong air in the strong creep condition) is required. The term "air blow" means the supply of air from an air passage by-passing a throttle valve of the engine 1 to an intake pipe positioned at a downstream of the throttle valve. Strength (amount) of air to be blown is adjusted by controlling degrees of opening of the air passage.

A signal transmitted from the engine 1 to the FI/MG ECU 4 and the CVT ECU 6 will be described. V__ANP represents a negative pressure value at the intake pipe of the engine 1. V__TH represents a throttle angle. V__TW represents a temperature of the cooling water at the engine 1. V__TA represents the intake temperature of the engine 1. The brake fluid temperature in the braking force retaining unit RU disposed within the engine compartment is obtained from the intake temperature. This is because both temperatures change with respect to the temperature at the engine compartment.

A signal transmitted from the CVT 3 to the FI/MG ECU 4 and the CVT ECU 6 will be described. V__VSP1 represents a vehicle speed pulse from one of two vehicle speed pickups provided in the CVT 3. Vehicle speed is calculated based on this vehicle speed pulse.

A signal transmitted from the CVT 3 to the CVT ECU 6 will be described. V__NDRP represents a pulse showing the number of revolutions of the drive pulley provided at the CVT 3. V__NDNP represents a pulse showing the number of revolutions of the driven pulley provided at the CVT 3. V__VSP2 represents a vehicle speed pulse from the other vehicle speed pickup at the CVT 3. The V__VSP2 is more accurate than the V__VSP1, and the V__VSP2 is used for calculating the amount of clutch slipping at the CVT 3.

A signal transmitted from the MOT ECU 5 to the FI/MG ECU 4 will be described. V__QBAT represents a remaining capacity of the battery. V__ACTTRQ represents an output torque value of the motor 2, which is the same as the V_MOTTRQ. I_MOT represents information such as the amount of generated energy of the motor 2 showing electric loading. The motor 2 generates all the electric power consumed for the vehicle including the electric power for driving the motor.

A signal transmitted from the FI/MG ECU 4 to the MOT ECU 5 will be described. V_CMDPWR represents an output required value to the motor 2. V_ENGTRQ represents an output torque value of the engine 1. I_MG represents information such as an actuation mode, assist mode and a regeneration mode with respect to the motor 2.

A signal transmitted from the master power MP to the FI/MG ECU 4 will be described. V_M/PNP represents a negative pressure detected value at a constant pressure chamber of the master power MP.

A signal transmitted from the positioning switch PSW to the FI/MG ECU 4 will be described. N or P is transmitted as positioning information when the positioning switch PSW selects either N range or P range.

A signal transmitted from the CVT ECU 6 to the CVT 3 will be described. V_DRHP represents a hydraulic pressure command value transmitted to the linear solenoid valve, which controls hydraulic pressure within the cylinder of the drive pulley at the CVT 3. V_DNHP represents a hydraulic pressure command value transmitted to the linear solenoid valve, which controls hydraulic pressure within the cylinder of the driven pulley at the CVT 3. The transmission gear ratio of the CVT 3 is changed by V_DRHP and V_DNHP. V_SCHP represents a hydraulic pressure command value transmitted to the linear solenoid valve, which controls hydraulic pressure of the starting clutch at the CVT 3. The engaging force of the starting clutch (driving force transmission capacity) is changed by V_SCHP.

A signal transmitted from the CVT ECU 6 to the braking force retaining unit RU will be described. F_SOLA is a flag for ON/OFF (close/open) the solenoid valve SV(A) of the braking force retaining unit RU (shown in FIG. 2). The numeral 1 is given for closing (ON) the solenoid valve SV(A), and the numeral 0 is given for opening (OFF) the solenoid valve SV(A). F_SOLB is a flag for ON/OFF (close/open) the solenoid valve SV(B) of the braking force retaining unit RU (shown in FIG. 2). The numeral 1 is given for closing (ON) the solenoid valve SV(B), and the numeral 0 is given for opening (OFF) the solenoid valve SV(B).

A signal transmitted from the positioning switch PSW to the CVT ECU 6 will be described. The positioning switch PSW selects N range, P range, R range, D range or L range, and the selected range is transmitted as positioning information.

A signal transmitted from the mode switch MSW to the CVT ECU 6 will be described. The mode switch MSW selects either D mode (normal running mode) or S mode (sports running mode), and the selected mode is transmitted as mode information. The mode switch MSW is a mode selection switch, which works when the positioning switch PSW is set in D range.

A signal transmitted from the brake switch BSW to the FI/MG ECU 4 and the CVT ECU 6 will be described. F_BKSW is a flag showing a condition whether the brake pedal BP is depressed (ON) or released (OFF). If the brake pedal BP is depressed, the numeral 1 is given, and if the brake pedal is released, the numeral 0 is given.

A signal transmitted from the CVT ECU 6 to the meter 10 will be described. The positioning switch PSW selects N range, P range, R range, D range or L range, and the selected range is transmitted as positioning information. Further, the mode switch MSW selects either D mode (normal running mode) or S mode (sports running mode), and the selected mode is transmitted as mode information.

<Construction of Braking Force Retaining Unit>

The braking force retaining unit RU mounted on the vehicle is incorporated in the brake fluid pressure circuit of the hydraulically operable braking device, and is constructed by a brake fluid pressure reduction speed control means for retaining reduction speed of brake fluid pressure within the wheel cylinder less than that of brake pedal load applied by the driver.

With reference to FIG. 2, the braking force retaining unit RU and the hydraulically operable braking device BK will be described.

[Hydraulically Operable Braking Device]

With reference to FIG. 2, the hydraulically operable braking device BK of the vehicle will be described. The brake fluid pressure circuit BC of the hydraulically operable braking device BK comprises brake fluid piping FP connecting the braking device BK to the master cylinder MC and the wheel cylinders WC. Since brake is a very important factor for a safety run, the braking device BK has two separate systems of brake fluid pressure circuits BC(A), BC(B). Therefore, if one system is out of order, the remaining system works for obtaining a minimum braking force.

Master cylinder pistons MCP, MCP are inserted into a main body of the master cylinder MC. When the driver applies a load to the brake pedal BP, the pistons MCP, MCP are pressed and pressure is applied to brake fluid so that mechanical force is converted into brake fluid pressure, i.e., the pressure applied to the brake fluid. When the driver releases the brake pedal BP for removing the applied load, the pistons MCP, MCP are returned to the original position by the resilient action of return springs MCS, MCS and the brake fluid pressure is released at the same time. In view of fail-safe mechanism, there are provided two separate brake fluid pressure circuits BC. For this reason, the master cylinder MC shown in FIG. 2 is a tandem master cylinder, where two pistons MCP, MCP are connected in series so that the main body of the master cylinder MC is divided into two portions.

A master power MP (brake booster) is provided between the brake pedal BP and the master cylinder MC so as to ease the braking effort of the driver. The master power MP shown in FIG. 2 is a vacuum servo type. The master power MP takes out negative pressure from an intake manifold of the engine 1 (not shown) so as to facilitate the braking operation of the driver.

The brake fluid piping FP connects the master cylinder MC and the wheel cylinders WC. The brake fluid piping FP functions as a fluid channel for brake fluid. Brake fluid pressure generated at the master cylinder MC is transmitted to the wheel cylinders WC since a flow of the brake fluid travels through the brake fluid piping FP. When the brake fluid pressure within the wheel cylinder WC is greater, the brake fluid is transmitted from the wheel cylinders WC to the master cylinder MC through the brake fluid piping FP. Since separate brake fluid pressure circuits BC are provided for the reason mentioned above, there are also provided two separate brake fluid piping systems FP. The brake fluid pressure circuit BC such as constructed by the brake fluid piping shown in FIG. 2 is an X-piping type, where one brake fluid pressure circuit BC(A) is for braking a front right wheel and a rear left wheel, and the other brake fluid pressure circuit BC(B) is for braking a front left wheel and a rear right wheel. The brake fluid pressure circuit may be a front and rear dividing piping type, where one brake fluid pressure circuit is for braking front wheels, and the other brake fluid pressure circuit is for braking rear wheels.

The wheel cylinder WC is provided for each wheel 8 so that brake fluid pressure generated at the master cylinder MC and transmitted to the wheel cylinder WC through the brake fluid piping FP is converted into a mechanical force (braking force) for braking wheels 8. A piston (not shown) is inserted into the wheel cylinder WC so that when the piston is pressed by brake fluid pressure, it generates braking force for actuating brake pads in the case of disc brakes or brake shoes in the case of drum brakes.

Additionally, there may be provided brake fluid pressure control valves for controlling brake fluid pressure within the wheel cylinders of the front and rear wheels.

[Braking Force Retaining Unit]

With reference to FIG. 2, the braking force retaining unit RU will be described. The braking force retaining unit RU comprises a brake fluid pressure reduction speed control means for retaining reduction speed of the brake fluid pressure within the wheel cylinder WC less than that of brake pedal load applied by the driver upon starting the vehicle. The brake fluid pressure reduction speed control means works such that the reduction speed of brake fluid pressure within the wheel cylinder WC (reduction speed of the braking force) becomes slower than that of the brake pedal load applied by the driver upon releasing the brake pedal BP.

The brake fluid pressure reduction speed control means having the above function is made by the provision of a flow resistance against a flow of the brake fluid in the brake fluid pressure circuit BC. It can be made by means for restricting the movement of the brake pedal BP, in addition to the brake fluid pressure circuit BC, so as to restrict the recovering speed of the brake pedal BP from a brake pedal acting position to the original position in such a way that the brake pedal BP slowly returns to its original position if the driver quickly releases the brake pedal BP. The former is for restricting a flow of the brake fluid per se, while the latter is for restricting the movement of the brake pedal BP. In either case, reduction speed of the brake fluid pressure within the wheel cylinder WC will be less than that of the brake pedal load applied by the driver. Detailed construction of the former type will be described below.

The braking force retaining unit RU including the brake fluid pressure reduction speed control means within the brake fluid pressure circuit BC of the hydraulically operable braking device BK will be described. Since the hydraulically operable braking device BK comprises two brake fluid pressure circuits BC(A), BC(B) of the same construction, merely one brake fluid pressure circuit BC(A) will be described. In order to restrict a flow of brake fluid per se, the brake fluid pressure circuit BC(A) is provided with a solenoid valve SV(A) and a restriction D, and if necessary a check valve CV and a relief valve RV. In the braking force retaining unit RU, the brake fluid pressure reduction speed control means is constructed by the solenoid valve SV(A) and the restriction D.

The solenoid valve SV(A) is ON (closed)/OFF (open) by an electric signal from the control unit CU. The solenoid valve SV(A) shuts off a flow of brake fluid within the brake fluid piping FP in its ON condition (closed condition), thereby retaining applied brake fluid pressure within the wheel cylinder WC. The solenoid valve SV(A) shown in FIG. 2 is in OFF condition (open condition). Provision of the solenoid valve SV(A) prevents unintentional backward displacement of the vehicle upon starting on a slope. This is because when the driver releases the brake pedal BP, brake fluid pressure is retained within the wheel cylinder WC. The term "unintentional backward displacement" means that the vehicle moves in an opposite direction due to its own weight (potential energy), in other words, the vehicle begins to descend backwards on a slope.

The solenoid valve SV(A) may be of both normally open and normally closed types. However, in view of fail-safe mechanism, a normally open type is preferable. This is because when electricity is cut off due to malfunction, brake does not work or brake always works in a normally closed type solenoid valve. In the normal operation, the solenoid valve SV(A) is ON (closed condition) when the vehicle stops, and is kept in the ON condition until the vehicle starts to move. Conditions for switching the solenoid valve SV(A) to ON (closed condition) or to OFF (open condition) will be described later.

The restriction D always connects the master cylinder MC and the wheel cylinders WC regardless of the ON/OFF conditions of the solenoid valve SV(A). Especially when the solenoid valve SV(A) is in ON condition (closed condition) and the driver gradually or instantly releases the brake pedal BP, the restriction D reduces brake fluid pressure within the wheel cylinder WC at a certain speed by gradually transferring brake fluid from the wheel cylinders WC to the master cylinder MC. Such a restriction D may be formed by the provision of a flow control valve in the brake fluid piping FP. Alternatively, the restriction D may be formed at a part of the brake fluid piping FP by way of a flow resistance (reduced area portion of the passage, at which a part of the section becomes narrow).

With the provision of the restriction D when the driver gradually or instantly releases the brake pedal BP, braking force is gradually lowered so that even if the solenoid valve SV(A) is in ON condition (closed condition), brake does not work permanently. In other words, reduction speed of brake fluid pressure within the wheel cylinder WC is less than that of brake pedal load applied by the driver. Therefore, even if the solenoid valve SV is in ON condition (closed condition), braking force is reduced after a certain period of time so that the vehicle can start to move on an up slope by driving force of the driving motor. Meanwhile, the vehicle can start off on a down slope due to its own weight without requiring the accelerator pedal operation of the driver.

The restriction D does not affect braking force as long as brake fluid pressure within the master cylinder MC due to the driver's brake pedal operation is greater than that within the wheel cylinder WC. This is because brake fluid flows based on a pressure difference between the wheel cylinder WC and the master cylinder MC, i.e. from one at higher brake fluid pressure to the other at lower brake fluid pressure. Unless the driver releases the brake pedal BP, the brake fluid pressure within the wheel cylinder WC does not lower although it may increase. The restriction D may function as a check valve so as to prevent a counter flow from the master cylinder MC to the wheel cylinder WC.

Reduction speed of brake fluid pressure within the wheel cylinder WC is determined so as to keep sufficient time for pedal-changing action of the driver from the brake pedal BP to the accelerator pedal that is the time for obtaining sufficient driving force of the motor to start the vehicle on the slope without unintentional backward displacement thereof. Normally, the time required for the pedal-changing action and for obtaining sufficient driving force of the motor is about 0.5 seconds.

In the case that the reduction speed of the brake fluid pressure within the wheel cylinder WC is faster, the vehicle will move backwards on the slope before sufficient driving force of the motor will be obtained since braking force after releasing the brake pedal BP will be immediately lost even if the solenoid valve SV(A) is in ON condition (closed condition). For this reason, this braking force retaining unit RU can not achieve the purpose for facilitating the starting operation on the slope. On the contrary, in the case that the reduction speed of the brake fluid pressure within the wheel cylinder WC is slower, the vehicle will not move backwards on the slope after releasing the brake pedal BP since the brake is working at all times. However, extra time and driving force is required for obtaining braking force and sufficient driving force to move the vehicle against the slope, leading to difficulty in the starting operation.

Reduction speed for reducing brake fluid pressure within the wheel cylinder WC is determined by properties of the brake fluid or shape of the restriction D (cross section or length of the flow pass). The restriction D may be employed as an integral member with a solenoid valve SV(A) and a check valve CV. In this case, the number of parts and install space may be reduced.

A check valve CV is provided in case of necessity. The check valve CV transfers brake fluid pressure generated within the master cylinder MC into the wheel cylinders WC on condition that the solenoid valve SV(A) is in ON condition (closed condition) and the driver increases brake pedal load. The check valve CV works effectively when brake fluid pressure generated within the master cylinder MC is greater than the brake fluid pressure within the wheel cylinder WC. The check valve CV quickly increases the brake fluid pressure within the wheel cylinder WC in accordance with the increased brake pedal load.

If an arrangement is employed such that the solenoid valve SV(A) is switched from the ON condition (closed condition) to the OFF condition (open condition) when brake fluid pressure within the master cylinder MC becomes greater than that within the wheel cylinder WC, there is no need to provide a check valve CV since the solenoid valve SV(A) itself responds to the increased brake pedal load.

A relief valve RV is also provided in case of necessity. The relief valve RV transfers brake fluid within the wheel cylinder WC into the master cylinder MC until brake fluid pressure within the wheel cylinder becomes a certain pressure level on condition that the solenoid valve SV(A) is in ON condition (closed condition) and the driver gradually or instantly releases the brake pedal BP. The relief valve RV works when brake fluid pressure within the wheel cylinder WC is greater than the predetermined brake fluid pressure and brake fluid pressure within the master cylinder MC. Therefore, even if the solenoid valve SV(A) is in ON condition (closed condition), extra brake fluid pressure within the wheel cylinder WC beyond the necessary brake fluid pressure is quickly reduced to a certain brake fluid pressure. This will ensure a smooth starting operation of the vehicle on a slope even if the driver forcefully depresses the brake pedal BP more than required. Provision of a relief valve RV eliminates a drawback that reducing brake fluid pressure within the wheel cylinder WC only through the restriction D, after releasing the brake pedal BP, requires a lot of time.

A brake switch BSW detects whether the brake pedal BP has been depressed or not. Based on the detected value, the control unit CU sends instructions as to ON/OFF operations of the solenoid valves SV(A), SV(B).

The braking force retaining unit RU is constructed by the solenoid valves SV(A), SV(B) and the restriction D. Although the braking force retaining unit RU is constructed by means for acting on brake fluid pressure as means for acting on a braking force, other means may be employed as long as they act on the braking force. For example, arrangement of the braking force retaining unit may be such that a servo valve is used instead of the solenoid valves SV(A), SV(B) and the restriction D, or that the recovering speed of the brake pedal BP is restricted. In the vehicle with a traction control system, which can generate brake fluid pressure regardless of depression of the brake pedal, control of braking force may be carried out as a function of the traction control system. Also, in the vehicle with an antilock braking system, which can control brake fluid pressure within the wheel cylinder upon depressing the brake pedal, control of brake fluid pressure within the wheel cylinder may be carried out as a function of the antilock braking system.

<Basic Operation of Braking Force Retaining Unit>

With reference to FIG. 2, basic operation of the braking force retaining unit RU will be described.

(Stop/Start Operations on Up Slope)

When the vehicle is stopped on an up slope, the driver depresses the brake pedal BP so as to prevent the vehicle from unintentional backward displacement due to its own weight. With depression of the brake pedal BP, brake fluid within the master cylinder MC is pressed, and brake fluid pressure within the master cylinder MC increases. This increased brake fluid pressure results in a flow of brake fluid, which flows from the master cylinder MC to the wheel cylinders WC through the brake fluid piping FP and the solenoid valves SV(A), SV(B) in open condition. Therefore, brake fluid pressure generated within the master cylinder MC is converted into braking force for braking wheels, and the vehicle can be stopped on the slope.

The control unit CU judges conditions including the vehicle being stopped, and turns the solenoid valves SV(A), SV(B) ON (closed condition) so as to retain brake fluid pressure within the wheel cylinder WC. The control unit CU is not required to judge whether the vehicle is stopped on a slope or not.

In the case of the arrangement where check valves CV, CV are employed, even if the solenoid valves SV(A), SV(B) are in ON condition (closed condition), braking force is increased through the check valves CV, CV when the driver further increases the brake pedal load.

In order to initiate a starting operation of the vehicle on the slope, the driver releases the brake pedal BP and in stead depresses the non-shown accelerator pedal. During the operation, since the solenoid valves SV(A), SV(B) are in ON condition (closed condition), the vehicle is prevented from unintentional backward displacement even if the driver releases the brake pedal BP. However, brake fluid pressure within the wheel cylinders WC gradually decreases through the restrictions D, D.

Meanwhile, when the driver depresses the accelerator pedal, driving force of the vehicle increases. The vehicle can start on the slope when the driving force of the vehicle becomes greater than the total amount of the prevention force, which prevents the vehicle from advancing the slope (displacement force due to the vehicle's own weight), and the braking force, which has been gradually reducing.

However, when the vehicle is on a steep slope, regardless of the solenoid valves SV(A), SV(B) being in ON condition (closed condition), the vehicle may displace backwards with the displacement force derived from the vehicle's own weight being greater than the retained braking force. Especially when the driver instantly or gradually releases the brake pedal BP, brake fluid pressure is gradually decreased by the restriction D, thereby decreasing braking force. In other words, since the retained braking force is gradually decreasing, the displacement force due to the vehicle's own weight may be greater than the retained braking force.

Provision of the restrictions D, D ensures a smooth starting operation of the vehicle on an up slope unless the vehicle displaces backwards for 0.5 seconds after releasing the brake pedal BP. Also, provision of the relief valves RV, RV ensures a smooth starting operation of the vehicle on a slope, even if the driver has forcefully depressed the brake pedal BP than required. This is because brake fluid pressure within the wheel cylinders WC immediately decreases to a certain brake fluid pressure level (relief pressure) after the driver instantly or gradually releases the brake pedal BP.

Brake dragging will be caused if the solenoid valves SV(A), SV(B) are continuously kept in ON condition (closed condition) after the vehicle starts moving on the slope. For this reason, the solenoid valves SV(A), SV(B) are preferably controlled so as to be OFF (open condition) when the driver initiates the starting operation. Specifically, the solenoid valves SV(A), SV(B) are controlled to be OFF (open condition) when the accelerator pedal is depressed in the case of automatic transmission vehicles. Further, in view of fail-safe performance, the solenoid valves SV(A), SV(B) may be controlled to be OFF (open condition) at a certain period of time (for example 2 to 3 seconds) after releasing the brake pedal BP. Depression and release of the brake pedal BP is detected by the brake switch BSW. Alternatively, in order to prevent unintentional brake dragging, the solenoid valves SV(A), SV(B) may be controlled to be OFF (open condition) when the vehicle reaches to a certain speed (for example 20 km/h).

(Stop/Start Operations on Down Slope)

When stopping the vehicle on a down slope, the driver depresses the brake pedal BP. The control unit CU judges conditions including the vehicle being stopped, and turns the solenoid valves SV(A), SV(B) ON (closed condition) so as to retain brake fluid pressure within the wheel cylinder WC, thereby retaining braking force.

Same as in the case of an up slope, if the vehicle is on a steep down slope, displacement force derived from the vehicle's own weight may be greater than the retained braking force regardless of the solenoid valves SV(A), SV(B) being in ON condition (closed condition). As a result, the vehicle advances on the slope.

In order to start off the vehicle on the down slope, the driver then releases the brake pedal BP. On a down slope, the driver often starts the vehicle without depressing the accelerator pedal. According to the brake fluid pressure retaining unit RU, since the restrictions D, D are provided, braking force gradually decreases after releasing the brake pedal BP. Braking force decreases even if the solenoid valves SV(A), SV(B) are ON condition (closed condition). Therefore, the driver can start the vehicle without operating the accelerator pedal.

With the provision of the braking force retaining unit RU, the driver can start the vehicle on a down slope without any difficulty. Further, the braking force retaining unit RU does not affect a smooth start operation of the vehicle on a down slope and a flat place. Since the control unit CU does not have to judge whether the vehicle is stopped on a slope or a flat surface, means for detecting slope is not necessary.

<Conditions for Retaining Brake Fluid Pressure>

Figure 3A:
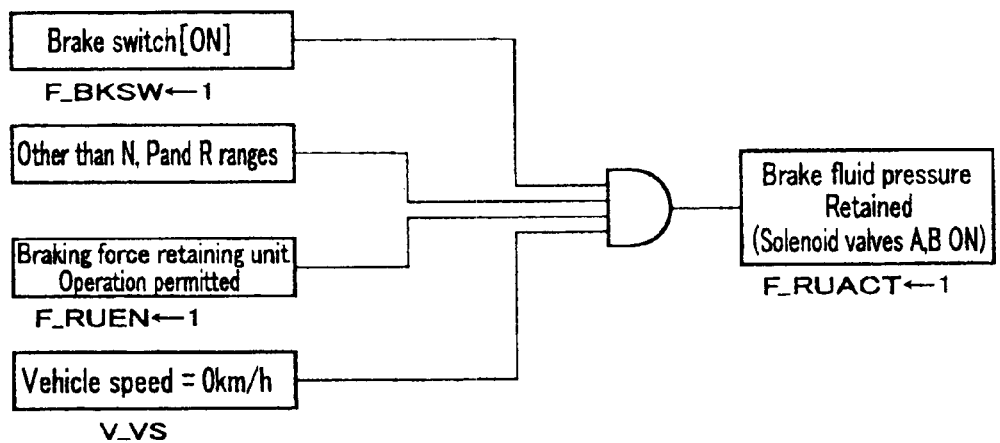
FIG. 3A shows the control logic for retaining brake fluid pressure.

Conditions that the braking force retaining unit RU retains brake fluid pressure will be described. As shown in FIG. 3A, brake fluid pressure is retained when all of the following four conditions are satisfied.

I) Brake switch BSW is ON.

II) Driving range is other than Neutral (N range), parking (P range) and Reverse (R range).

III) Operation of the braking force retaining unit RU is permitted.

IV) Vehicle speed is 0 km/h.

When all the above conditions are satisfied, both solenoid valves SV(A), SV(B) are ON (closed condition), thereby retaining brake fluid pressure within the wheel cylinder WC. These conditions are judged by the control unit CU.

I) The brake switch BSW has to be ON, otherwise no brake fluid pressure or few brake fluid pressure will be retained within the wheel cylinders WC. Also, the driver does not intend to apply brake on the vehicle when the brake switch BSW is OFF.

II) The driving range selected is other than N, P and R range (i.e. D or L range). This is for canceling unnecessary operation of the braking force retaining unit RU in N range or P range, and in R range, for preventing the vehicle from unintentional backward displacement with the aid of driving force in the strong creep condition since the strong creep condition is kept in the Reverse range.

Therefore, brake fluid pressure is retained while the driving range is in D range or L range.

III) Operation of the braking force retaining unit RU is permitted. This is for reminding the driver of sufficiently depressing the brake pedal BP before retaining brake fluid pressure so that unintentional backward displacement of the vehicle on a slope can be prevented. Since sufficient driving force is obtained in the strong creep condition such that the vehicle can stand still on a slope at an inclination angle of 5 degrees, the driver often depresses the brake pedal BP insufficiently. Meanwhile, in the weak creep condition and the middle creep condition, driving force is not sufficient for stationarily retaining the vehicle on a slope having an inclination angle of 5 degrees. For this reason, the driver is reminded of forcefully depressing the brake pedal BP so as to retain sufficient brake fluid pressure for preventing backward displacement on the slope. The control logic for permitting an operation of the braking force retaining unit RU will be described later.

IV) Vehicle speed is 0 km/h. This is because the driver can not select a position for parking the vehicle if the solenoid valves SV(A), SV(B) are ON (closed condition) during the vehicle is running. Meanwhile, since the vehicle stops while the vehicle speed is 0 km/h, braking force can be retained without any troubles in the driving operation. "Vehicle speed of 0 km/h" also includes a condition just before the vehicle stops.

[Conditions Required for Permitting Operation of the Braking Force Control Unit]

Figure 3B:
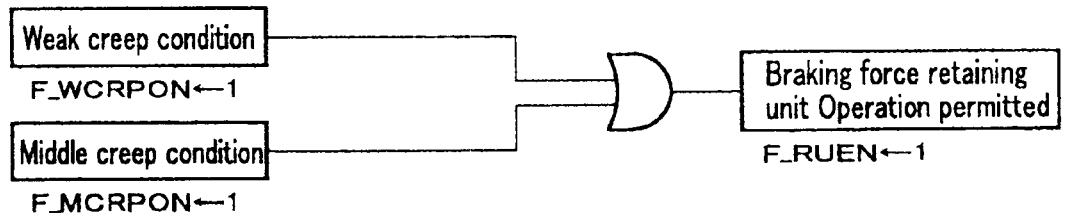
FIG. 3B shows the control logic for permitting an operation of the braking force retaining unit.

With reference to FIG. 3B, conditions required for permitting an operation of the braking force retaining unit RU will be described. An operation of the braking force retaining unit RU is permitted while driving force is either in the weak creep condition or in the middle creep condition. In the weak creep condition and the middle creep condition, driving force is not sufficient for stationarily retaining the vehicle on a slope having an inclination angle of 5 degrees. For this reason, the driver is forced to depress the brake pedal BP sufficiently before retaining brake fluid pressure so as to retain sufficient brake fluid pressure (braking force) for preventing backward displacement of the vehicle. Driving force in the weak creep condition or in the middle creep condition is judged based on a hydraulic pressure command value to the linear solenoid valve of the CVT 3, where the engagement hydraulic pressure of the starting clutch is controlled.

[Conditions Required for Weak Creep Order]

Figure 4A:
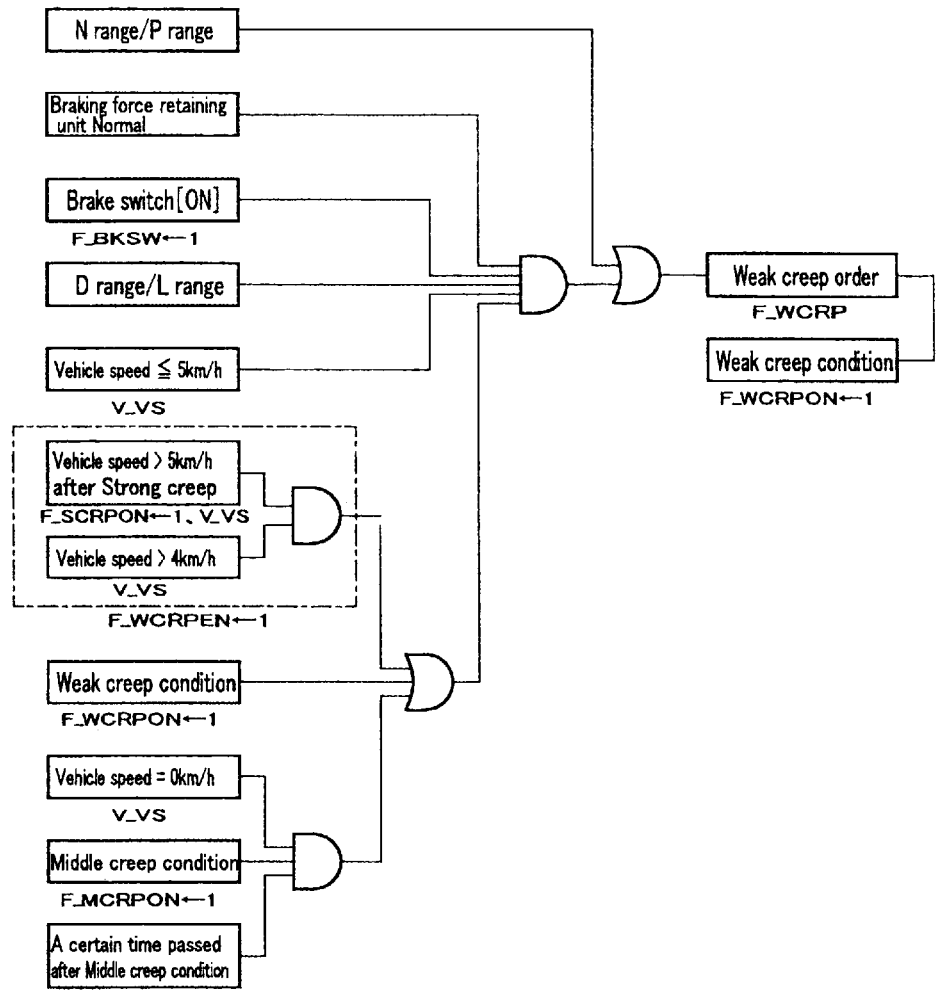
FIG. 4A shows the control logic for switching to a weak creep condition.

Conditions for transmitting the weak creep order will be described. As shown in FIG. 4A, the weak creep order (F_WCRP) is transmitted when any of the following conditions I) and II) is satisfied. The conditions are:

I) Transmission is selected to N range or P range (N/P range).

II) [(1) Braking force retaining unit RU is normal; (2) Brake switch BSW is ON; (3) Advance range (D range/L range) is selected; and (4) Vehicle speed is under or equal to 5 km/h] and further [(5) Vehicle speed after switching to the strong creep condition >5 km/h and vehicle speed>4 km/h; or (6) Driving force is in the weak creep condition; or (7) Vehicle speed is 0 km/h, Driving force is in the middle creep condition, and a certain time has passed after switching to the middle creep condition].

When one of the above conditions I) and II) is satisfied, the weak creep order is transmitted and the driving force is switched to the weak creep condition.

The above conditions are judged at the driving force control unit DCU. As mentioned above, the reason for switching driving force to the weak creep condition is for reminding the driver of forcefully depressing the brake pedal BP so as to prevent unintentional backward displacement of the vehicle as well as for improving fuel consumption of the vehicle.

I) When the transmission is selected to N range or P range, driving force is always switched to the weak creep condition. This is because if the transmission is selected from a non-driving range (N/P range) to a driving range (D/L/R range) and at the same time the accelerator pedal is quickly depressed, the driving force transmission capacity of the starting clutch can be instantly increased, allowing a smooth starting operation of the vehicle. In the weak creep condition, since pressure oil has been filled in an oil pressure chamber of the starting clutch, there is no clearance or play for the advance stroke of the piston enforcing the clutch. Therefore, the driving force transmission capacity is instantly increased by increasing the pressure value of the pressure oil.

Driving force is switched to the weak creep condition when the transmission is selected to N or P range. This is for previously changing the driving force transmission capacity of the starting clutch to the capacity at the weak creep condition. However, the driving force from the engine 1 is not transmitted to the driving wheels 8, 8. This is distinguished from the weak creep condition while the transmission is selected to D/L range.

In N/P range, connection between the engine 1 and the driving wheels 8,8 is completely cut by a forward/reverse movement switching mechanism arranged in series with the starting clutch on a driving force transmission path. Since neither a transmission path for the forward movement nor a transmission path for the reverse movement is provided in N/P range, the driving force from the engine 1 is not transmitted to the driving wheels 8, 8.

II) Conditions (1) to (4) are basic requirements for switching to the weak creep condition. Meanwhile, conditions (5) to (7) indicate conditions of the vehicle before switching to the weak creep condition.

(1) The braking force retaining unit RU is normal. Braking force is not retained if the braking force retaining unit RU is out of order. Since sufficient driving force is not obtained in the weak creep condition, the vehicle will displace backwards on a slope. If the weak creep order is transmitted and driving force is switched to the weak creep condition regardless of abnormal conditions of the vehicle, eg the solenoid valves SV(A), SV(B) are not switched to ON (closed condition), brake fluid pressure is not retained within the wheel cylinder WC when releasing the brake pedal BP. Therefore, if the driver releases the brake pedal BP upon starting on the slope, braking force is suddenly lost and the vehicle displaces backwards. A smooth starting operation without unintentional backward displacement of the vehicle is therefore achieved by the strong creep condition.

(2) The brake switch BSW is ON. This is because the driver does not intend reduction of driving force.

(3) An advance range (D/L range) is selected. This is for improving fuel consumption of the vehicle while an advance range is selected. When the positioning switch PSW selects D range, driving force is switched to the weak creep condition notwithstanding the position (D mode/S mode) of the mode switch MSW. However, in the R range, the driving force is not switched to the weak creep condition. This is for facilitating a steering operation of the vehicle at a garage with the vehicle kept in the strong creep condition.

(4) Vehicle speed is under or equal to 5 km/h. This is because driving force of the driving wheels 8, 8 is transmitted to the engine 1 or the motor 2 through the starting clutch of the CVT 3 so as to obtain engine brake or carry out regenerative power generation by the motor 2.

(5) Vehicle speed after switching to the strong creep condition>5 km/h and the vehicle speed>4 km/h. This is because switching to the weak creep condition is carried out merely by deceleration due to continued brake application. Since the difference of the driving force is greater between the strong creep condition and the weak creep condition, the driver may experience unintentional strong deceleration if the driving force is switched from the strong creep condition to the weak creep condition by the depression of the brake pedal BP. Also, the vehicle may displace backwards in a moment if the vehicle stops on a slope. In such circumstance, it is preferable that the switching operation from the strong creep condition to the weak creep condition is not carried out. To this end, once switched to the strong creep condition, the driving force is not changed to the weak creep condition until the throttle is OFF (depression of the accelerator pedal is released) over the vehicle speed of 5 km/h and the driving force is switched to the strong creep condition for driving. The vehicle speed may decrease to 5 km/h, after being switched to the strong creep condition, without depression of the brake pedal BP even if the vehicle once speeds up over 5 km/h and then the driving force is decreased (strong creep condition for driving). For example, when the vehicle moves on an up slope, the vehicle speed may decrease without depression of the brake pedal BP. In such circumstance, since the brake switch BSW is OFF, the driving force is switched to the strong creep condition when the vehicle speed decreases to 5 km/h. In order to cancel a successive switching operation from the strong creep condition to the weak creep condition, a further condition, i.e., vehicle speed>4 km/h is required. The switching operation to the weak creep condition is not carried out unless the brake pedal BP is depressed when the vehicle speed again decreases to 5 km/h. If the brake pedal BP is depressed (brake switch BSW [ON]) when the vehicle speed again decreases to 5 Km/h, the driving force is switched from the strong creep condition for driving to the weak creep condition. In other words, if the driving force is not changed to the weak creep condition when the vehicle speed again decreases to 5 km/h (vehicle speed=5 km/h), the strong creep condition is retained as long as the vehicle speed is under or equal to 5 km/h.

(6) Driving force is in the weak creep condition. This is because once switched to the weak creep condition, the weak creep condition is retained regardless of the conditions (5) and (7). According to the condition (5), driving force is switched to the weak creep condition when the vehicle speed becomes 5 km/h. However, if the vehicle speed is less than 5 km/h, the condition (5) is not satisfied. The weak creep condition is not retained merely by the condition (5) if the vehicle speed is under 5 km/h. As a result, "driving force is in the weak creep condition" is required so as to retain the weak creep condition under the vehicle speed of 5 km/h. (7) Vehicle speed is 0 km/h, driving force is in the middle creep condition, and a certain time has passed after switching to the middle creep condition. This is because deteriorated fuel consumption and vibration of the vehicle body, while the vehicle stops in the strong creep condition, are prevented with the driving force switched to the weak creep condition. The strong creep condition is retained if driving force is not changed to the weak creep condition when the vehicle speed again decreases to 5 km/h (vehicle speed=5 km/h) (based on the condition (5)), or if the vehicle speed under or equal to 5 km/h is retained after switching to the strong creep condition by way of releasing the brake pedal BP while being in the weak creep condition. However, if the vehicle stops in the strong creep condition with the brake pedal depressed, fuel consumption is deteriorated and vibration of the vehicle remains. For this reason, when the vehicle completely stops (vehicle speed=0 km/h), driving force is switched to the middle creep condition, in which driving force is between the strong creep condition and the weak creep condition, and thereafter, if a certain time has passed (300 msec in this embodiment), the driving force is further switched to the weak creep condition. Since braking force due to depression of the brake pedal BP increases while driving force is stepwise reduced from the strong creep condition to the middle creep condition and further to the weak creep condition, the momentary displacement amount of the vehicle on an up slope is restricted as small as possible.

[Conditions Required for Strong Creep Condition for Driving]

Figure 4B:
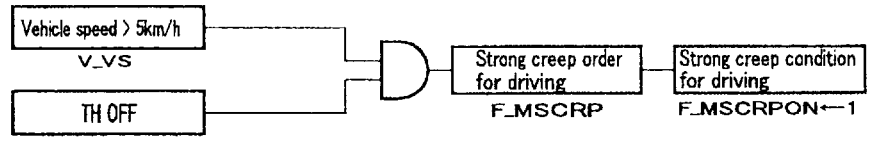
FIG. 4B shows the control logic for switching to a strong creep condition for driving.

Conditions required for strong creep condition for driving will be described. Creep diving force is switched to the strong creep condition for driving after a strong creep order for driving (F_MSCRP) is transmitted. The strong creep order for driving (F_MSCRP) is transmitted when both of the following two conditions I) and II) are satisfied (FIG. 4B).

I) Vehicle speed>5 km/h.
II) Throttle is OFF.

These conditions are judged at the driving force control unit DCU. One reason for switching driving force to the strong creep condition for driving is for preventing a strong deceleration of the vehicle before stopping due to the switching operation from the strong creep condition to the weak creep condition. Another reason is for preventing momentary backward displacement of the vehicle on an up slope while the vehicle stops. Driving force is switched to the strong creep condition for driving, which is weaker than the strong creep condition, in advance of switching to the weak creep condition.

I) vehicle speed>5 km/h. This is because the switching operation from the strong creep condition to the weak creep condition is carried out on condition that the vehicle speed is once over 5 km/h after the strong creep condition and then the vehicle speed becomes 5 km/h. This is also for discriminating between the strong creep condition under or equal to the vehicle speed of 5 km/h and the strong creep condition for driving over the vehicle speed of 5 km/h.

II) Accelerator pedal is not depressed (Throttle is OFF). Since the driver does not intend further increment of the driving force, driving force may decrease without any problems.

[Conditions Required for Middle Creep Condition]

Figure 4C:
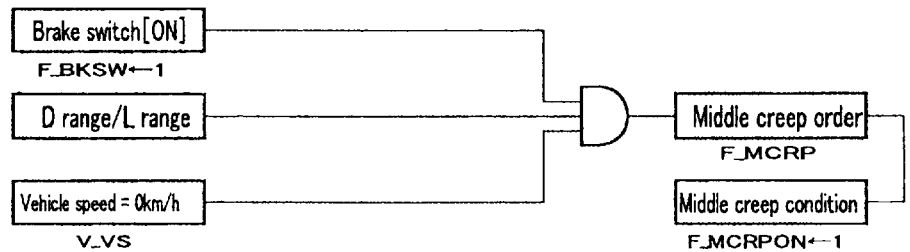
FIG. 4C shows the control logic for switching to a middle creep condition.

Conditions required for the middle creep condition will be described. As shown in FIG. 4C, when the following three conditions I), II) and III) are satisfied, a middle creep order (F_MCRP) is transmitted.

I) Brake switch BSW is ON.
II) Advance range (D/L range) is selected.
III) Vehicle is fully stopped (vehicle speed=0 km/h).

These conditions are judged at the driving force control unit DCU. The strong creep condition is retained if driving force is not changed to the weak creep condition when the vehicle speed again decreases to 5 km/h (vehicle speed=5 km/h) or if the vehicle speed under or equal to 5 km/h is retained after switching to the strong creep condition by way of releasing the brake pedal BP while being in the weak creep condition. However, if the vehicle remains stopping in the strong creep condition, fuel consumption is deteriorated and vibration of the vehicle continues. For this reason, the middle creep condition is required. As previously mentioned, in order to prevent momentary backward displacement of the vehicle, which is due to switching from the strong creep condition to the weak creep condition while the vehicle stops, driving force is switched to the middle creep condition.

I) The brake switch BSW is ON. This is because the driver does not intend to reduce driving force when the brake pedal BP is not depressed.

II) Advance range (D/L range) is selected. It is necessary for switching to the middle creep condition while an advance range is selected since driving force is switched to the weak creep condition while the positioning switch is selected to D range or L range. Switching to the middle creep condition is not necessary in N/P range since the weak creep condition is selected as soon as the transmission is switched. Also, switching to the middle creep condition is not necessary in R range since the strong creep condition is retained in R range.

III) The vehicle is fully stopped (vehicle speed=0 km/h). Driving force is switched to the weak creep condition in order to prevent deteriorated fuel consumption and vibration of the vehicle while the vehicle stops in the strong creep condition. The middle creep condition is required as a transitional condition to the weak creep condition.

Judgement whether or not the driving force is in the weak creep condition, strong creep condition for driving or the middle creep condition is made based on the hydraulic pressure command value to the starting clutch of the CVT 3.

[Conditions for Automatically Turning off the Engine]

Figure 5:
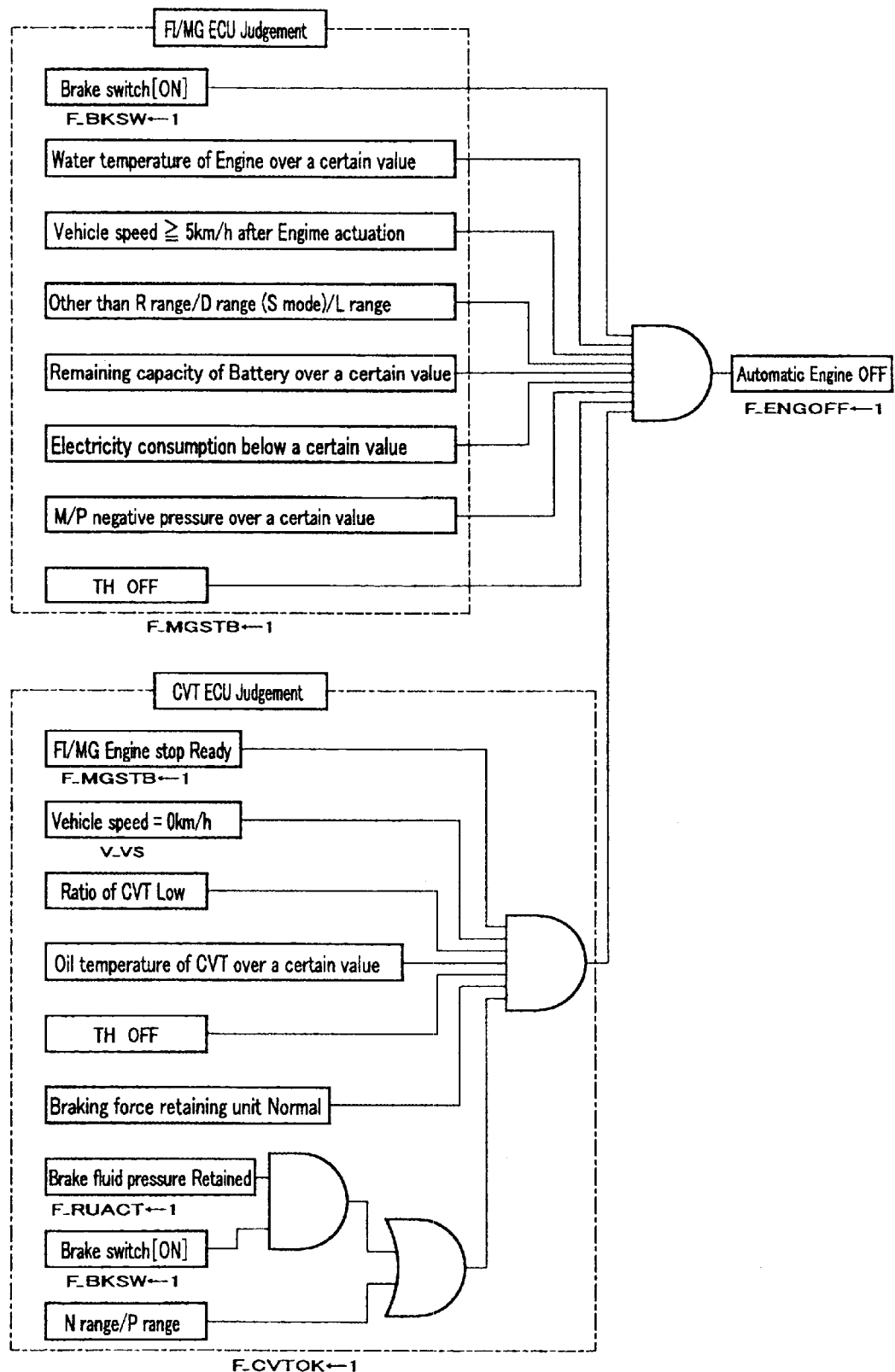
FIG. 5 shows the control logic of a driving motor stopping unit according to a preferred embodiment of the invention, in which the engine is automatically turned off.

For the purpose of further improvement of fuel consumption, the engine 1 is automatically turned off while the vehicle stops. Conditions for automatically turning off the engine 1 will be described. When all the conditions shown in FIG. 5 are satisfied, an engine stop order (F_ENGOFF) is transmitted and the engine 1 is automatically turned off. The automatic engine stop operation of the engine 1 is carried out by the driving motor stopping unit. Therefore, the following automatic engine stop conditions are judged at the driving motor stopping unit. Specifically, the automatic engine stop conditions are judged at the FI/MG ECU 4 and the CVT ECU 6. When the FI/MG ECU 4 judges that all the following conditions I) to VIII) are satisfied, the F_MGSTB becomes 1. When the CVT ECU 6 judges that all the following conditions IX) to XV) are satisfied, the F_CVTOK becomes 1.

I) Brake switch BSW is ON. This is for warning the driver. The driver places his foot on the brake pedal BP when the brake switch BSW is ON. Therefore, if the engine 1 is stopped and driving force is lost, the driver can easily increase a brake pedal load before the vehicle unintentionally displaces backwards on a slope.

II) Water temperature of the engine is over a certain value. This is because the turn-on/turn-off operation of the engine 1 should be carried out when the engine 1 is in stable conditions. In a cold area, if the water temperature is low, the engine 1 may not restart.

III) Vehicle speed once reaches to 5 km/h after engine actuation. This is for facilitating a steering operation at a garage while the vehicle moves in the creep running. The steering operation at a garage will be time-consuming if the engine 1 is turned off whenever the vehicle stops for changing steering directions.

IV) Positioning switch selects other than R range/D range (S mode)/L range, i.e., positioning switch selects N range/D range (D mode)/P range. This is for the following reasons. A steering operation at a garage while selecting R rage or L range will be time-consuming if the engine 1 is turned off whenever the vehicle stops for changing steering directions. When the positioning switch PSW selects D range and the mode switch MSW selects S mode, the driver is expecting a quick start operation of the vehicle.

V) Capacity of the battery is over a certain value. If the remaining capacity of the battery is not enough to restart the engine 1, the motor cannot actuate the engine 1 after turning off the engine.

VI) Electricity consumption is below a certain value. This is for securing sufficient electrical supply to loads.

VII) Load of the constant pressure chamber of the master power MP is over a certain value. This is because the smaller negative pressure in the constant pressure chamber of the master power MP, the smaller amplification of the brake load when depressing the brake pedal BP, leading to deteriorated braking performance. Since negative pressure in the constant pressure chamber is obtained from the intake pipe of the engine 1, negative pressure in the constant pressure chamber becomes far smaller if the engine 1 is stopped at smaller negative pressures. This leads to reduced amplification of the brake load when the driver depresses the brake pedal BP, and hence resulting in deteriorated braking performance.

VIII) Accelerator pedal is not depressed (TH OFF). Since the driver does not intend further increment of driving force, the engine 1 may be automatically turned off.

IX) All the automatic engine stop conditions at FI/MG ECU 4 are satisfied. If all the engine stop conditions judged at the FI/MG ECU 4 are not satisfied, it is not preferable to carry out the automatic engine stop operation.

X) Vehicle speed is 0 km/h. Driving force is not required when the vehicle stops.

XI) Ratio of the CVT is low. This is because a smooth starting operation of the vehicle is not carried out unless the ratio of the CVT (pulley ratio) is low.

XII) Oil temperature of the CVT is over a certain value. If the oil temperature of the CVT 3 is low, start-up for hydraulic pressure of the starting clutch will cause a delay. Therefore, the required time from the engine actuation to the strong creep condition is extended, and the vehicle will displace backwards on a slope.

XIII) Accelerator pedal is not depressed (TH OFF). Since the driver does not intend further increment of driving force, the engine 1 may be automatically turned off.

XIV) Braking force retaining unit RU is normal. Since brake fluid pressure may not be retained if the braking force retaining unit RU is out of order, the strong creep condition is kept for preventing the vehicle from unintentional backward displacement.

XV) [(1) Brake fluid pressure is retained (solenoid valves SV(A), SV(B) are ON (closed condition), and Brake switch BSW is ON] or [(2) Positioning switch PSW selects N range/P range]. This is for the following reasons:

(1) As long as brake fluid pressure that is braking force is retained, the vehicle does not displace backwards on a slope even if the engine 1 is automatically turned off and driving force is lost. Further, when the brake switch BSW is ON, the driver places his foot on the brake pedal BP. Therefore, if the engine 1 is stopped and the driving force is lost, the driver can easily increase a brake pedal load before the vehicle unintentionally displaces backwards on a slope.

(2) If the vehicle stops with the positioning switch PSW selecting P range or N range, the driver intends to pull up the vehicle. Therefore, the engine 1 may be automatically turned off. In this condition, the engine 1 is automatically turned off even if the braking force retaining unit RU is not actuated and no braking force is retained.

<Conditions for Releasing Retained Brake Fluid Pressure>

Figure 6A:
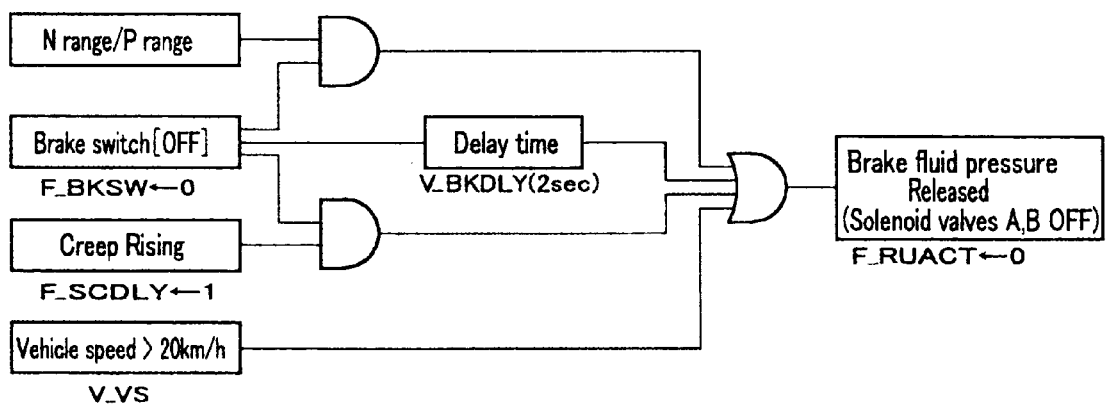
FIG. 6A shows the control logic for releasing brake fluid pressure to be retained.

Conditions that the braking force retaining unit RU releases retained brake fluid pressure will be described. As shown in FIG. 6A, retained brake fluid pressure is released when any of the following conditions is satisfied:

I) Positioning switch PSW selects N range/P range and Brake switch BSW is OFF.

II) A certain delay time has passed after brake switch BSW becomes OFF.

III) Creep driving force has risen and Brake switch BSW is OFF.

IV) Vehicle speed is over 20 km/h.

When any of the above conditions is satisfied, the two solenoid valves SV(A), SV(B) are OFF (open condition) for releasing brake fluid pressure retained within the wheel cylinders WC. The above conditions are judged at the control unit CU.

I) The positioning switch PSW selects N range/P range and the brake switch BSW is OFF. This is for eliminating unnecessary operation of the braking force retaining unit RU.

II) A certain delay time has passed after brake switch BSW becomes OFF. It is not preferable as a fail-safe action that brake fluid pressure is permanently retained after releasing the brake pedal BP and brake dragging occurs. In the preferred embodiment, the delay time is about 2 seconds after releasing the brake pedal BP, i.e. after the brake switch BSW is OFF.

III) Creep driving force has risen and Brake switch BSW is OFF. This is for canceling retention of unintentional and unnecessary braking force while sufficient driving force occurs against a slope. The reason for releasing retained brake fluid pressure when creep driving force is risen is that there is no need to retain brake fluid pressure within the wheel cylinder WC so as prevent backward displacement of the vehicle since when creep driving force is risen, sufficient driving force is obtained for stationary retaining the vehicle on the slope even if the braking force retaining unit RU is not actuated. Further, when depression of the brake pedal BP is released (brake switch BSW is OFF), the driver does not require braking force.

IV) Vehicle speed is over 20 km/h. This is for eliminating unnecessary brake dragging as a fail-safe action.

[Requirement for Creep Rising Condition]

Figure 6B:
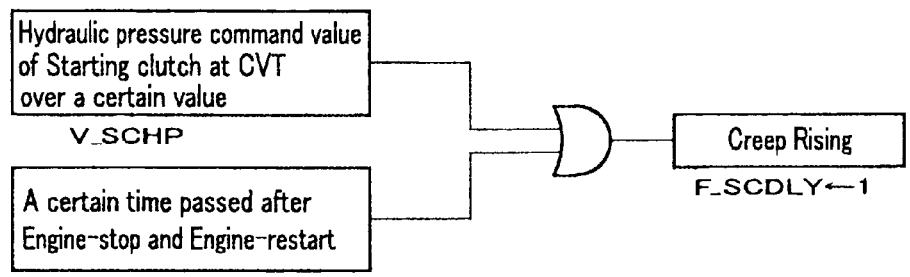
FIG. 6B shows the control logic for judging a creep rising condition.

Requirement for a creep rising condition will be described. As shown in FIG. 6B, when any of the following conditions I) and II) is satisfied, it is considered that the creep diving force has risen.

I) Hydraulic pressure command value of the starting clutch at the CVT 3 is over a certain value.

II) A certain time has passed after the engine 1 is automatically turned off and then restarted.

These two conditions are judged at the driving force control unit DCU. In the creep rising condition, driving force has been increased to such an extent that backward displacement of the vehicle on the slope is prevented, even if operation of the braking force retaining unit RU is disengaged and no braking force is retained. Specifically, in the creep rising condition, driving force has been increased to such an extent that backward displacement of the vehicle on the slope is prevented, taking into consideration the inertial force and the rolling resistance (increasing driving force) of the vehicle. The creep rising condition also includes a condition allowing slight backward displacement of the vehicle, as long as the increasing driving force minimize the backward displacement of the vehicle.

I) When the hydraulic pressure command value of the starting clutch at the CVT 3 is over a certain value, driving force has been increased to such an extent that backward displacement of the vehicle is prevented even if retained brake fluid pressure is released. "The hydraulic pressure command value over a certain value" indicates that the hydraulic pressure command value—it is transmitted to the linear solenoid valve, which controls the hydraulic pressure for the engaging force of the starting clutch—has been increasing to a half value between the weak creep condition and the strong creep condition, in the process switching from the weak creep condition to the strong creep condition.

II) A certain time has passed after the engine 1 is automatically turned off and then restarted. It is considered that if retention of brake fluid pressure is released, sufficient driving force has been increased against the slope. Time-counting is initiated when the engine 1 is automatically restarted and supply of the pressure oil to the starting clutch is started. Hydraulic oil has been discharged from the oil pressure chamber of the starting clutch at the CVT 3 while the engine 1 is turned off. Therefore, a clearance or play exists for the advance stroke of the piston enforcing the clutch when the engine 1 is actuated and supply of the pressure oil is initiated. For this reason, the hydraulic pressure command value to the linear solenoid valve of the starting clutch does not correspond to the actual hydraulic pressure value (driving force transmission capacity). When increasing the driving force from the engine stop condition, it is impossible to judge the creep rising condition based on the hydraulic pressure command value of the starting clutch. As a result, the creep rising condition is judged when a timer counts a certain period time after the supply of the pressure oil to the starting clutch is initiated.

[Conditions Required for Strong Creep Order]

Figure 7A:
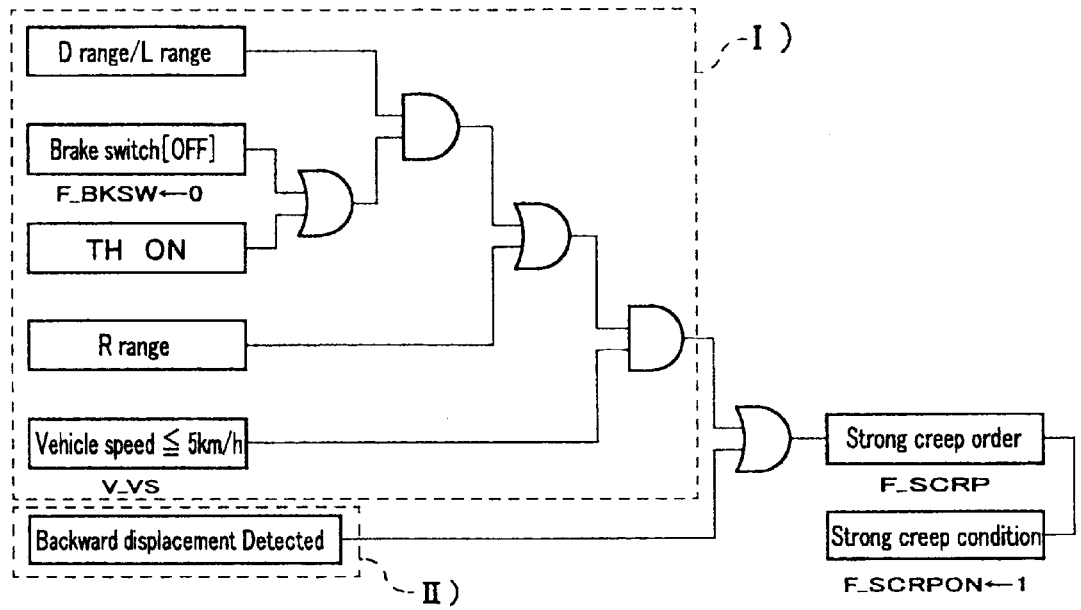
FIGS. 7A and 7B show the control logic for switching to the strong creep condition. Here.
Figure 7B:
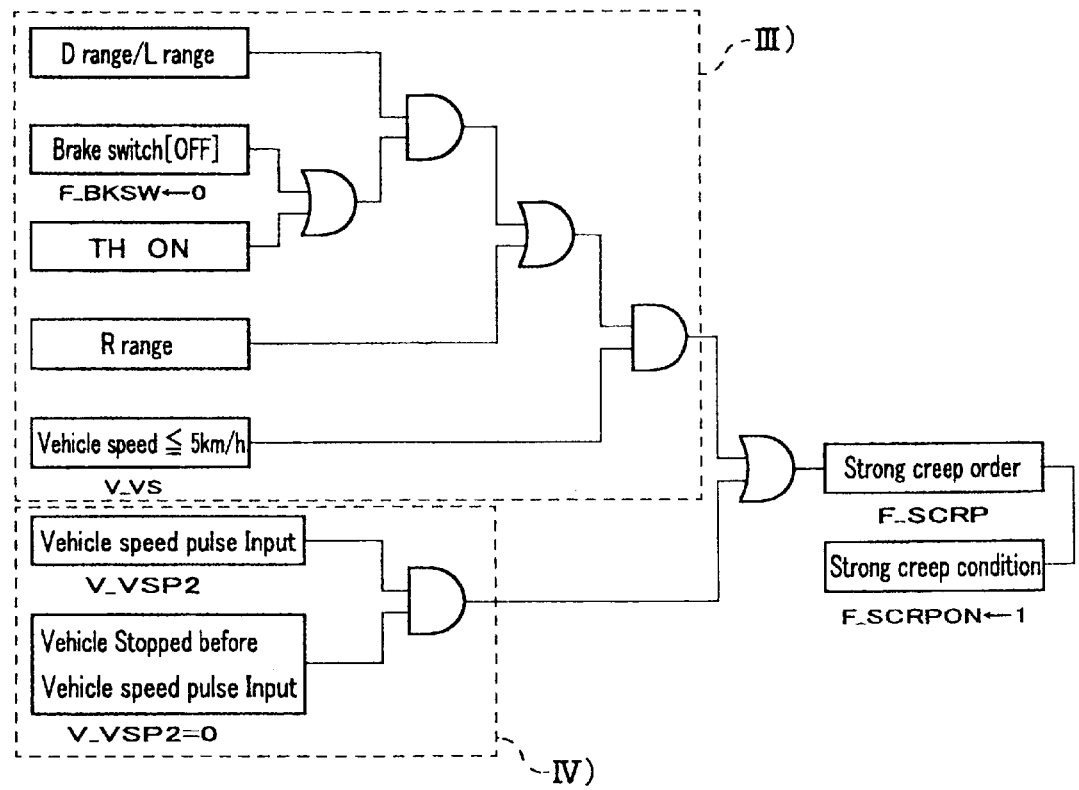

Conditions for the strong creep order will be described. The strong creep order (F_SCRP) is transmitted when any of the following two conditions shown in FIGS. 7A and 7B is satisfied. The first condition required for the strong creep order is that either I) or II) is satisfied (FIG. 7A).

I) [(1) Brake switch is OFF or Throttle is ON, and Advance range (D/L rage) is selected] or [(2) Reverse (R) range is selected] and (3) Vehicle speed is under or equal to 5 km/h.

II) Backward displacement of the vehicle is detected.

Meanwhile, the second condition required for the strong creep order is that either III) or IV) is satisfied (FIG. 7B).

III) [(1) Brake switch is OFF or Throttle is ON, and Advance range (D/L range) is selected] or [(2) Reverse (R) range is selected] and (3) Vehicle speed is under or equal to 5 km/h.

IV) Vehicle speed pulse is input and Vehicle is fully stopped before the input of vehicle speed pulse.

In the first and the second conditions required for the strong creep order, I) and III) are identical, while II) and IV) are different. Therefore, explanation of the condition III) is omitted. These conditions I) to IV) are judged at the driving force control unit DCU.

(1) Brake switch is OFF or throttle is ON, and advance range (D/L rage) is selected. Since the driver initiates a starting operation, driving force is changed to the strong creep condition. The driver has an intention to start the vehicle since the positioning switch PSW is selected to D range or L range and further depression of the brake pedal BP is released or instead the accelerator pedal is depressed. Therefore, the driving force is switched from the weak creep condition to the strong creep condition.

With the depression of the accelerator pedal, the driving force transmission capacity increases, even after reaching to the greater driving force transmission capacity (strong creep condition), to a capacity allowing to transmit all the driving force generated at the driving motor (condition greater than the greater driving force transmission capacity). However, the flag showing the strong creep condition (F_SCRPON) is kept until another flag rises.

(2) Reverse (R)range is selected. This is for ensuring a smooth creep driving in R range. When the positioning switch PSW is selected to R range, the driver expects a steering operation at a garage with the driving force switched to the strong creep condition. Therefore, the driving force is switched from the weak creep condition to the strong creep condition.

(3) The vehicle speed under or equal to 5 km/h. This is because the strong creep condition for driving at a vehicle speed over 5 km/h can be distinguished from the strong creep condition at a vehicle speed under or equal to 5 km/h.

II) Backward displacement of the vehicle is detected. When the vehicle starts to displace backwards on a steep slope with the backward displacement force derived from the vehicle's own weight being greater than the braking force, the driving force in the strong creep condition prevents the backward displacement of the vehicle. When the vehicle stops on an up slope, the total amount of the driving force in the weak creep condition (the driving force is zero if the engine 1 is automatically turned off) and the braking force resists the backward displacement force of the vehicle. However, since the greater inclination angle of the slope, the greater backward displacement force, the vehicle starts to displace backwards on the steep slope with the backward displacement force being greater than the total amount of the driving force in the weak creep condition and the braking force. For this reason, when backward displacement of the vehicle is detected, the driving force is switched from the weak creep condition (engine stop condition when the engine 1 is turned off) to the strong creep condition in any circumstances so as to generate sufficient driving force against the slope.

Figure 9A:
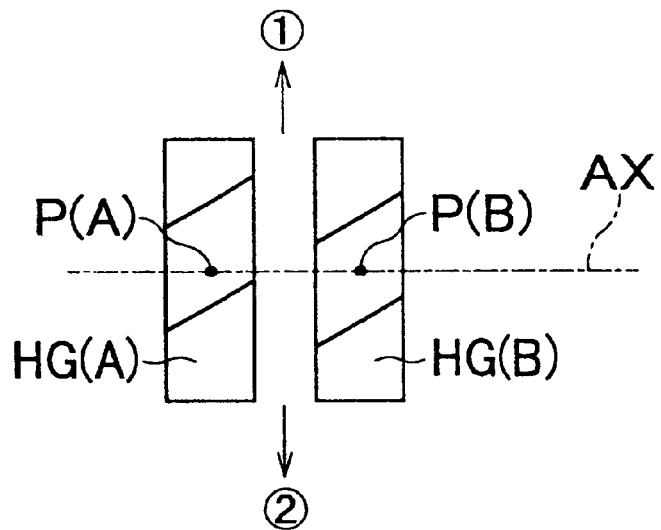
FIG. 9A shows a construction thereof.
Figure 9B:
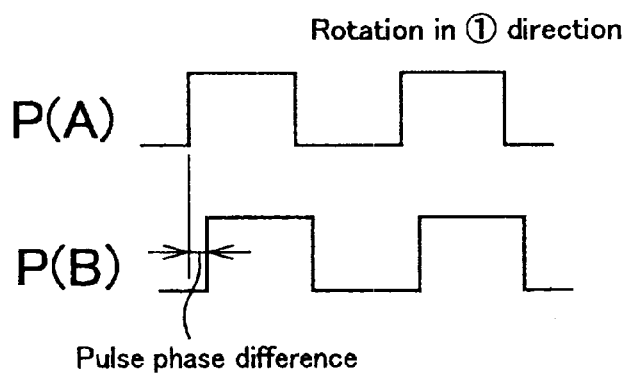
FIG. 9B shows a pulse phase for ① direction of FIG. 9A.
Figure 9C:
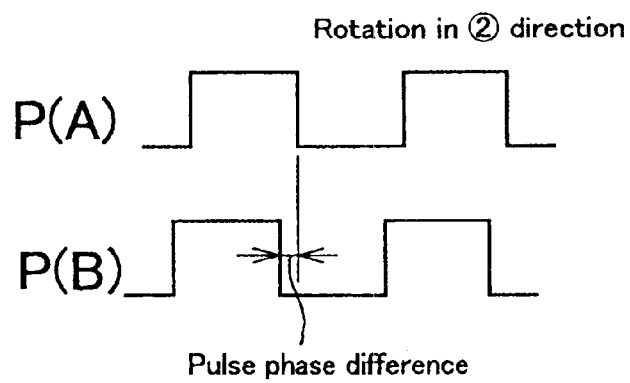
FIG. 9C shows a pulse phase for ② direction of FIG. 9A.

With reference to FIG. 9, means for detecting backward displacement of the vehicle will be described. For example, helical gears HG(A), HG(B) are provided at a downstream of the starting clutch of the CVT 3. The helical gears HG(A), HG(B) may be provided at any positions as long as they are rotatable with the tires. As shown in FIG. 9A, gear tooth of the helical gears HG(A), HG(B) are positioned in helical and diagonal relation around the periphery of the gear. The phase of the gear tooth shifts with the rotation of the helical gears HG(A), HG(B) in ① and ② directions. To this end, electromagnetic pick-ups P(A), P(B) are provided on the respective helical gears HG(A), HG(B) so as to align in the same axis AX of the helical gears. The electromagnetic pick-ups P(A), P(B) detect the front ends of the gear tooth. Direction of the rotation is obtained from the pulse phase difference based on the two pulses detected at the electromagnetic pick-ups P(A), P(B). As best seen in FIG. 9B, when the helical gears HG(A), HG(B) rotate to the ① direction, the pulse detected at the electromagnetic pick-up P(B) shifts back from that detected at the electromagnetic pick-up P(A). In other words, the front end of the gear teeth of the helical gear HG(A) is detected before that of the gear teeth of the helical gear HG(B). Meanwhile, when the helical gears HG(A), HG(B) rotate to the ② direction, the pulse detected at the electromagnetic pick-up P(B) shifts forward to that detected at the electromagnetic pick-up P(A) (FIG. 9C). In other words, the front end of the gear teeth of the helical gear HG(A) is detected after that of the gear teeth of the helical gear HG(B). Direction of the rotation is therefore detected by the pulse phase difference. Supporting that the rotation in the ① direction indicates backward displacement of the vehicle, backward displacement is detected by the relative positions of the two pulses obtained from the electromagnetic pick-ups P(A), P(B) mentioned above. As long as having a phase difference, any known gears other than helical gears HG(A), HG(B) may be employed.

IV) A vehicle speed pulse is input and the vehicle is fully stopped before the input of the vehicle speed pulse. This is for the following reason. When the vehicle displaces from the fully stopped position, backward displacement (possible backward displacement) of the vehicle is detected and then the driving force is switched to the strong creep condition so as to keep the vehicle against the slope. Although displacement of the vehicle is detected, judgement is not carried out to specify the direction as to whether the vehicle moves forward or backwards. When the vehicle stops on an up slope, the total amount of the driving force in the weak creep condition (the driving force is zero if the engine 1 is automatically turned off) and the braking force resists the backward displacement force of the vehicle. However, since the greater inclination angle of the slope, the greater backward displacement force, the vehicle starts to displace forward (on a down slope) or backwards (on an up slope) with the displacement force derived from the vehicle's own weight being greater than the total amount of the driving force in the weak creep condition and the braking force. For this reason, when forward or backward displacement (i.e. displacement) of the vehicle is detected, the driving force is switched from the weak creep condition (engine stop condition when the engine 1 is turned off) to the strong creep condition so as to generate sufficient driving force against the slope. For the purpose of the detection that the vehicle completely stops, the vehicle speed pulse of zero is detected before a vehicle speed pulse is input. Displacement of the vehicle is detected even from one vehicle speed pulse input. The driving force may be switched to the strong creep condition even if the vehicle displaces to the same direction as the driver's intention.

[Conditions for Automatically Turning On the Engine]

Figure 8B:
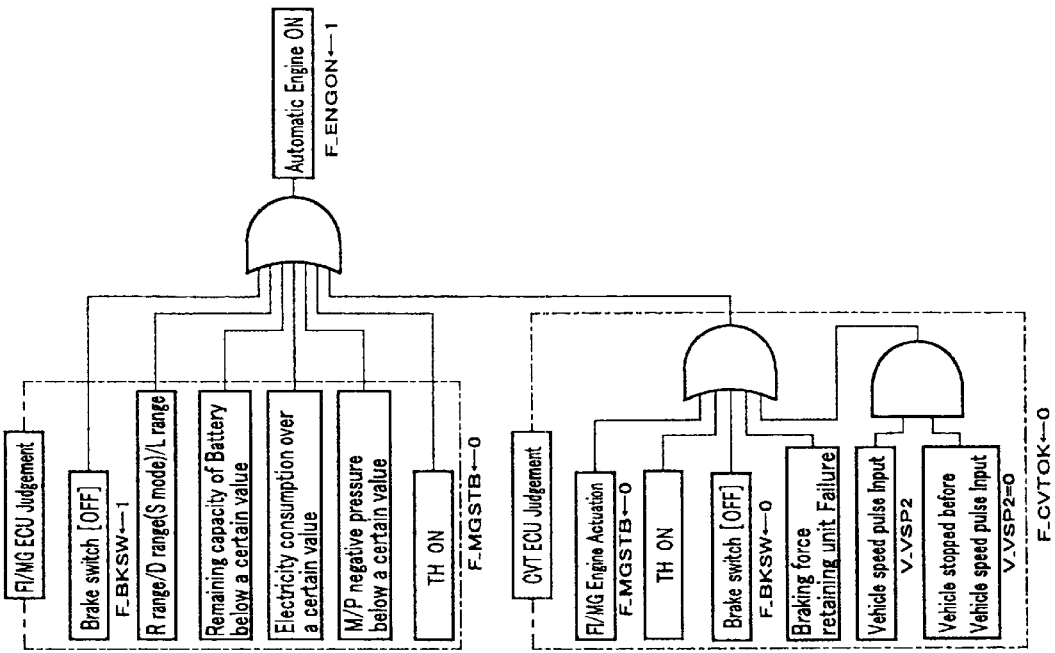
FIGS. 8A and 8B show the control logic for automatically turning on the engine. Here.
Figure 8A:
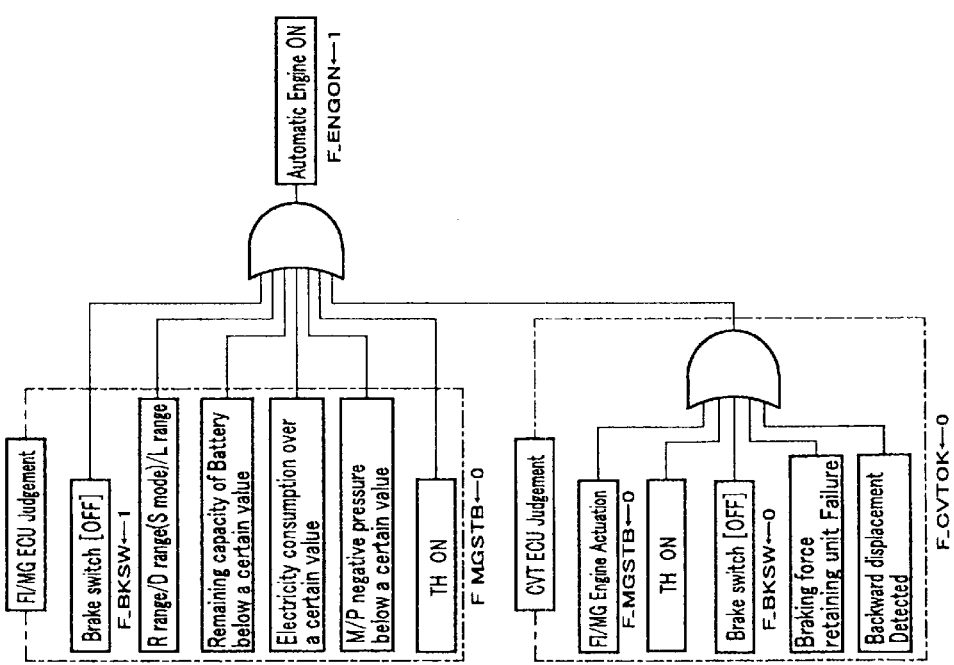

After automatically turning off the engine 1, the engine 1 is automatically restarted in the following conditions. When any of the following conditions shown in FIGS. 8A and 8B is satisfied, the automatic engine actuation order (F_ENGON) is transmitted and the engine 1 is automatically actuated. The automatic engine actuation is carried out by the driving motor stopping unit. Therefore, the following automatic engine actuation conditions are judged at the driving motor stopping unit. Specifically, the automatic engine actuation conditions are judged at the FI/MG ECU 4 and the CVT ECU 6. When the FI/MG ECU 4 judges that any of the following conditions I) to VI) is satisfied, the F_MGSTB becomes 0. When the CVT ECU 6 judges that any of the following conditions VII) to XI) [or VII) to X) and XII)] is satisfied, the F_CVTOK becomes 0. When at least one of the F_MGSTB and the F_CVTOK becomes 0, the engine actuation order (F ENGON) is transmitted. The first condition required for the automatic engine actuation order (shown in FIG. 8A) is the same as the second condition shown in FIG. 8B, except for the conditions XI) and XII) which are judged by the CVT ECU 6. Therefore, explanation refers merely to the condition XII) as to the second condition required for the automatic engine actuation order.

I) Depression of the brake pedal BP is released (Brake switch BSW is OFF). This is because judgement of the starting operation is carried out when the driver releases the brake pedal BP. When the driver releases the brake pedal BP in D range/D mode, it is considered that the driver initiates the starting operation. Therefore, the engine 1 is automatically actuated. Meanwhile, the driver releases the brake pedal BP in P range or N range so as to pull off and leave from the vehicle. In this circumstance, the engine 1 is automatically actuated in order to remind the driver not to leave from the vehicle without turning off the ignition switch.

II) R range/D range (S mode)/L range is selected. This is because the driver intends to start the vehicle quickly if the transmission is selected to R range/D range (S mode) /L range after the engine 1 is turned off. Therefore, when the engine 1 is turned off with the transmission selected other than R range/D range (S mode)/L range and thereafter switched to R range/D range (S mode)/L range, the engine 1 is automatically actuated.

III) Remaining capacity of the battery is below a certain value. This is because the engine 1 is not automatically actuated if the remaining capacity of the battery is not enough. The engine 1 is not turned off unless the remaining capacity of the battery is over a certain value. However, capacity of the battery may lower after the engine 1 is automatically turned off. In this case, the engine 1 is automatically actuated for the purpose of battery charge. The certain value is set to be higher than the critical battery capacity, below which the engine 1 is not actuated.

IV) Electricity consumption is over a certain value. While electricity consumers such as lights are working on, capacity of the battery decreases quickly. As a result, the engine 1 will not be restarted. For this reason, irrespective of the remaining capacity of the battery, the engine 1 is automatically actuated when the electricity consumption is over a certain value.

V) Negative pressure of the master power MP is below a certain value. The lower the negative pressure at the master power MP, the less braking force is obtained. Therefore, the engine 1 is restarted for securing sufficient braking force.

VI) Accelerator pedal is depressed (TH ON). This is because the driver is expecting driving force by the engine 1. Therefore, the engine 1 is automatically actuated when the accelerator pedal is depressed.

VII) Engine 1 is actuated while the automatic engine stop conditions at FI/MGECU 4 are not satisfied. This is because the engine 1 has to be actuated since at least one of the automatic engine actuation conditions is satisfied.

VIII) Accelerator pedal is depressed (throttle is ON). This is because the driver is expecting driving force by the engine 1. Therefore, the engine 1 is automatically actuated when the accelerator pedal is depressed.

IX) Depression of the brake pedal BP is released (Brake switch BSW is OFF). This is because judgement of the starting operation is carried out when the driver releases the brake pedal BP. When the driver releases the brake pedal BP in D range/D mode, it is considered that the driver initiates the starting operation. Therefore, the engine 1 is automatically actuated.

X) Braking force retaining unit RU is out of order. When the braking force retaining unit RU is out of order and braking force is not retained, the vehicle displaces backwards (forward) on a slope with the automatic engine stop operation. Therefore, when the solenoid valves SV(A), SV(B) of the braking force retaining unit RU are out of order, the engine 1 is automatically actuated and the vehicle is kept in the strong creep condition. If failure is detected in the braking force retaining unit RU after turning off the engine 1, the engine 1 is immediately actuated such that driving force of the vehicle is kept in the strong creep This is because braking force may not be retained after releasing the brake pedal BP upon starting the vehicle. In other words, it is the strong creep condition that prevents the vehicle from unintentional backward displacement and facilitates a smooth starting operation of the vehicle.

XI) Backward displacement of the vehicle is detected. When the vehicle starts to displace backwards on a steep slope with the backward displacement force derived from the vehicle's own weight being greater than braking force, the vehicle is prevented from backward displacement by driving force of the engine 1. When the vehicle stops on an up slope, braking force resists the backward displacement force of the vehicle. However, since the greater inclination angle of the slope, the greater backward displacement force, the vehicle starts to displace backwards on the steep slope with the backward displacement force being greater than the braking force. For this reason, when backward displacement of the vehicle is detected, the driving force is switched from the engine stop condition to the strong creep condition in any circumstances so as to generate sufficient driving force against the slope. Since the way of detecting backward displacement of the vehicle has been referred in [Conditions required for Strong Creep Order], further explanation will be omitted.

XII) A vehicle speed pulse is input and the vehicle is fully stopped before the input of the vehicle speed pulse. This is for the following reason. When the vehicle displaces from the fully stopped position, backward displacement (possible backward displacement) of the vehicle is detected and then the engine 1 is automatically actuated so as to generate driving force against the slope. Although displacement of the vehicle is detected, judgement is not carried out to specify the direction as to whether the vehicle moves forward or backwards. When the vehicle stops on an up slope with the engine 1 turned off, merely braking force resists the backward displacement force of the vehicle. However, since the greater inclination angle of the slope, the greater backward displacement force, the vehicle starts to displace forward (on a down slope) or backwards (on an up slope) with the displacement force derived from the vehicle's own weight being greater than the braking force. For this reason, when forward or backward displacement (i.e. displacement) of the vehicle is detected, the engine 1 is automatically actuated so as to generate sufficient driving force in the strong creep condition. For the purpose of detection that the vehicle completely stops, the vehicle speed pulse of zero is detected before a vehicle speed pulse is input. Displacement of the vehicle is detected even from one vehicle speed pulse input.

<Time Chart for Control with Automatic Engine Stop Operation>

Figure 10:
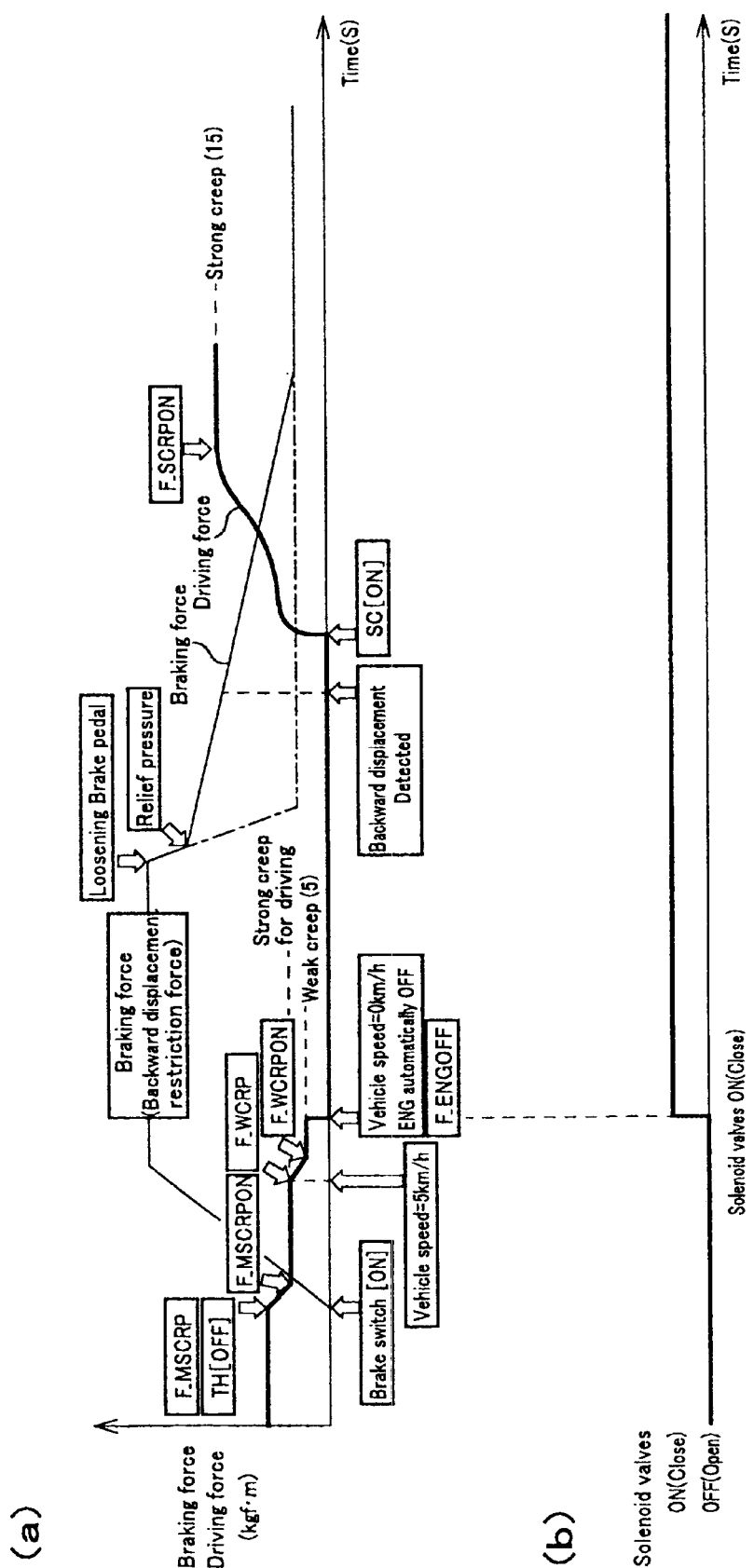
FIG. 10 is a time chart for the control of the vehicle with the braking force retaining unit, in which the engine is automatically turned off. Here, (a) indicates relations (increase or decrease) between driving force and braking force, and (b) indicates conditions (ON/OFF) of solenoid valves.

With reference to FIG. 10, the way of control will be described for a vehicle having the above system configuration. The vehicle is operated in the order of braking, stopping and starting. In this control, driving force is switched from the strong creep condition for driving to the weak creep condition by the driving force control unit DCU, and the engine 1 is turned off by the driving motor stopping unit. The vehicle is supposed to stop on an up slope. The positioning switch PSW and the mode switch MSW of the vehicle are not changed from D range/D mode. The braking force retaining unit RU is provided with a relief valve RV. Further, the vehicle is provided with means for detecting backward displacement.

In the time chart of FIG. 10(a), the processes of increasing and decreasing driving force and braking force of the vehicle are shown in time sequence order. Here, a thick line indicates driving force and a thin line indicates braking force. In the time chart of FIG. 10(b), ON/OFF (close/open) of the solenoid valves SV(A), SV(B) is shown.

The driving force control unit DCU transmits a strong creep order for driving (F_MSCRP) when the driver releases the accelerator pedal (throttle is OFF) during the vehicle is running (vehicle speed>5 km/h). Driving force is then switched to the strong creep condition for driving (F_MSCRPON), which is less than the strong creep condition (F_SCRPON).

If the driver releases the accelerator pedal and depresses the brake pedal BP (brake switch BSW is ON), braking force increases. When the vehicle speed falls to 5 km/h with continued braking application, the driving force control unit DCU transmits a weak creep order (F_WCRP) and driving force is switched to the weak creep condition (F_WCRPON). When do so, since the driving force decreases to the weak creep condition through the strong creep condition for driving, the driver does not experience a strong deceleration.

When the vehicle speed falls to 0 km/h, the braking force retaining unit RU turns the solenoid valves SV(A), SV(B) ON (closed condition) so as to retain braking force. Further, the driving motor stopping unit automatically turns off the engine 1 (F_ENGOFF) and the driving force is lost. When do so, the solenoid valves SV(A), SN(B) are ON (closed condition) and brake fluid pressure is retained within the wheel cylinders WC. Since the engine 1 is turned off after the weak creep condition, the driver forcefully depresses the brake pedal BP to such an extent that the vehicle is prevented from backward displacement on a slope. For this reason, even if the engine 1 is automatically turned off, the vehicle does not displaces backwards on the slope (backward displacement restriction force). The vehicle receives displacement force due to its own weight on an up slope. However, since the retained braking force is greater than the displacement force due to the vehicle's own weight, the vehicle does not displace backwards. The engine 1 is automatically turned off for the purposes of improved fuel consumption as well as restriction of exhaust gas.

The driver then loosens depression of the brake pedal BP in order to stand by for restarting the vehicle. If the diver depresses the brake pedal BP more than a preset pressure of the relief valve RV (relief pressure), the relief valve RV actuates upon the driver loosening the brake pedal BP and braking force immediately decreases to the relief pressure. Provision of the relief valve RV ensures a smooth starting operation of the vehicle on a slope even if the driver depresses the brake pedal BP more than required. Loosening depression of the brake pedal BP does not mean to completely release depression of the brake pedal BP, but to depress the brake pedal BP to a certain extent. Therefore, the brake switch BSW continuously keeps ON when depression of the brake pedal BP is loosened.

When the driver loosens depression of the brake pedal BP and brake fluid pressure falls below the relief pressure, brake fluid pressure within the wheel cylinders WC gradually decreases by the restriction D of the braking force retaining unit RU. Braking force decreases accordingly. In the end, the retained braking force decreases lower than the displacement force derived from the vehicle's own weight. As a result, the vehicle starts to displace backwards. The vehicle then detects backward displacement and transmits an engine automatic actuation order (F_ENGON). After a time lag derived from a delay of signal communication and mechanisms, the engine 1 is automatically actuated and supply of pressure oil to the starting clutch at the CVT 3 is initiated (SC [ON]).

Hydraulic oil has been discharged from the oil pressure chamber of the starting clutch at the CVT 3 while the engine 1 is turned off. Therefore, when the engine 1 is actuated and supply of pressure oil to the starting clutch is initiated, driving force rises due to resistance of a piston enforcing the clutch. Further, a clearance or play exists for the advance stroke of the piston while the engine 1 is turned off since hydraulic oil has been discharged. Therefore, the hydraulic pressure command value to the starting clutch does not correspond to the actual hydraulic pressure value (driving force transmission capacity) hence the driving force transmission capacity of the starting clutch increases little by little until the oil pressure chamber is filled with hydraulic oil. As a result, driving force gradually increases, and when the oil pressure chamber is filled with hydraulic oil, the driving force then increases to the strong creep condition (F_SCRPON) in accordance with the hydraulic pressure command value. During the increment to the strong creep condition (F_SCRPON), the solenoid valves SV(A), SV(B) are in ON condition (closed condition) and brake fluid flows to the master cylinder MC only through the narrow restriction D such that braking force gradually decreases. Braking force corresponds to the brake pedal depression after loosening thereof.

As mentioned above, when backward displacement of the vehicle is detected, the automatic engine actuation operation is initiated immediately, thereby increasing driving force. As a result, the total amount of the increased driving force and the retained braking force becomes greater than the displacement force derived from the vehicle's own weight, preventing backward displacement of the vehicle.

As shown in FIG. 10(a), a phantom line is extending downwardly from "Relief pressure" on the line indicating braking force. The phantom line indicates a case when brake fluid pressure is not retained. In this case, reduction of braking force takes place immediately after decreasing brake pedal load applied by the driver.

<Time Chart for Control Without Automatic Engine Stop Operation>

Figure 11:
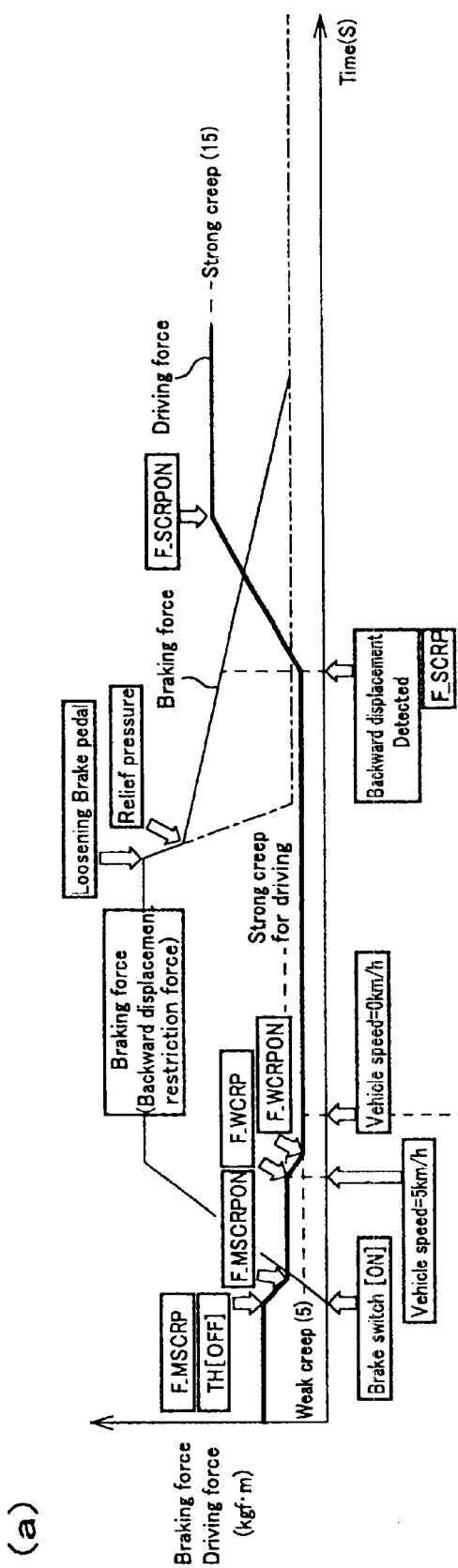
FIG. 11 is a time chart for the control of the vehicle with the braking force retaining unit, in which the engine is not automatically turned off. Here, (a) indicates relations (increase or decrease) between driving force and braking force, and (b) indicates conditions (ON/OFF) of solenoid valves.
Figure 11:
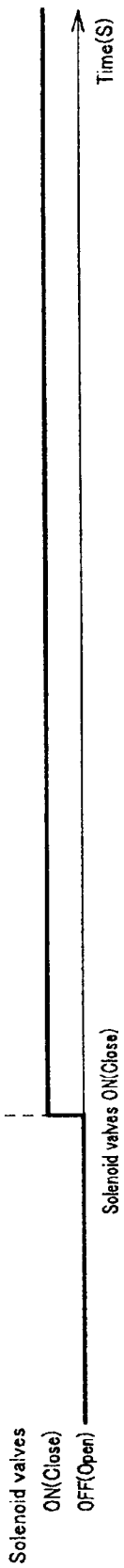

With reference to FIG. 11, the way of control will be described for a vehicle having the above system configuration. The vehicle is operated in the order of braking, stopping and starting. In this control, driving force is switched from the strong creep condition for driving to the weak creep condition by the driving force control unit DCU. However, the engine 1 is not automatically turned off. The vehicle is supposed to stop on an up slope. The positioning switch PSW and the mode switch MSW of the vehicle are not changed from D range/D mode. The braking force retaining unit RU is provided with a relief valve RV. The vehicle is provided with means for detecting backward displacement.

In the time chart of FIG. 11(a), the processes of increasing and decreasing driving force and braking force of the vehicle are shown in time sequence order. Here, a thick line indicates driving force and a thin line indicates braking force. In the time chart of FIG. 11(b), ON/OFF (close/open) of the solenoid valves SV(A), SV(B) is shown.

Since the processes before driving force is switched to the weak creep condition are the same as those described in <Time Chart for Control with Automatic Engine Stop Operation>, further explanation is omitted.

When the vehicle speed falls to 0 km/h, the braking force retaining unit RU turns the solenoid valves SV(A), SV(B) ON (closed condition) so as to retain braking force. However, the engine 1 is not automatically turned off since the automatic engine stop conditions are not satisfied or the vehicle is not provided with the driving motor stopping unit. With the solenoid valves SV(A), SV(B) switched to ON (closed condition), brake fluid pressure is retained within the wheel clinder WC. Since the vehicle stops after the weak creep condition, the driver forcefully depresses the brake pedal BP to such an extent that the vehicle is prevented from backward displacement on a slope. For this reason, even if driving force is in the weak creep condition, the vehicle does not displaces backwards on the slope (backward displacement restriction force). When the vehicle stops on an up slope, the vehicle weight affects to displace the vehicle. However, the vehicle does not displace backwards since the total amount of the driving force in the weak creep condition and the braking force to be retained is greater than the backward displacement force due to the vehicle weight.

The driver then loosens depression of the brake pedal BP in order to stand by for restarting the vehicle. If the diver depresses the brake pedal BP more than a preset pressure of the relief valve RV (relief pressure), the relief valve RV actuates upon the driver loosening the brake pedal BP and braking force immediately decreases to the relief pressure. Provision of the relief valve RV ensures a smooth starting operation of the vehicle on a slope even if the driver depresses the brake pedal BP more than required.

When the driver loosens depression of the brake pedal BP and brake fluid pressure falls below the relief pressure, brake fluid pressure within the wheel cylinders WC gradually decreases by the restriction D of the braking force retaining unit RU. Braking force decreases accordingly. In the end, the total amount of driving force in the weak creep condition and the retained braking force decreases lower than the displacement force derived from the vehicle's own weight. As a result, the vehicle starts to displace backwards. The vehicle then detects backward displacement and transmits a strong creep order (F_SCRP).

In the weak creep condition, the oil pressure chamber of the starting clutch has been filled with hydraulic oil. Since no clearance or play exists for the advance stroke of the piston, the hydraulic pressure command value to the starting clutch corresponds to the actual hydraulic pressure value (driving force transmission capacity). As a result, driving force increases to the strong creep condition (F_SCRPON) in accordance with the hydraulic pressure command value. During the increment to the strong creep condition (F_SCRPON), the solenoid valves SV(A), SV(B) are in ON condition (closed condition) and brake fluid flows to the master cylinder MC only through the narrow restriction D such that braking force gradually decreases. Braking force corresponds to the brake pedal depression after loosening thereof.

As mentioned above, when backward displacement of the vehicle is detected, the strong creep order is transmitted immediately, thereby increasing driving force. As a result, the total amount of the increased driving force and the retained braking force becomes greater than the displacement force derived from the vehicle's own weight, preventing backward displacement of the vehicle.

As shown in FIG. 11(a), a phantom line is extending downwardly from "Relief pressure" on the line indicating braking force. The phantom line indicates a case when the brake fluid pressure is not retained. In this case, reduction of braking force takes place immediately after decreasing brake pedal load applied by the driver.

In the vehicle with a braking force retaining unit according to the present invention, backward displacement of the vehicle can be prevented since driving force is immediately increased when displacement force derived from the vehicle's own weight becomes greater than the retained braking force and backward displacement (or displacement) of the vehicle occurs. Further, there is no need to employ a pressuring device (such as a hydraulic pump in the case of hydraulically operable braking device) since, in order to restrict backward displacement of the vehicle, driving force is increased without increasing braking force.

While the present invention has been described by way of a specific example, it is to be understood that changes and variations may be made without departing from the spirit or scope of the following claims.

For example, the braking force retaining unit has been described to be constructed from means for acting on brake fluid pressure. However, as long as acting on braking force, other means may be employed.

Also, helical gears and electromagnetic pick-ups are employed as means for detecting backward displacement of the vehicle. However, other means may be employed as long as displacement (or backward displacement) of the vehicle can be detected.

What is claimed is:

1. A vehicle with a braking force retaining unit, which retains a braking force after releasing a brake pedal, wherein the vehicle further comprises means for automatically increasing a driving force if displacement of the vehicle is detected while the braking force retaining unit is in operation.

2. A vehicle with a braking force retaining unit, which retains a braking force after releasing a brake pedal, wherein a driving force of the vehicle is automatically increased if displacement of the vehicle is detected while the braking force retaining unit is in operation.

3. The vehicle according to claim 1, wherein the means for automatically increasing a driving force includes a driving force control unit which has a continuously variable transmission electronic control unit.

4. The vehicle according to claim 3, wherein the driving force control unit facilitates the increase of the driving force to a strong creep condition upon detection of the displacement of the vehicle while the braking force retaining unit is activated.

* * * * *